United States Patent
Lim et al.

(10) Patent No.: US 6,389,484 B1
(45) Date of Patent: *May 14, 2002

(54) TRANSPORT INDEPENDENT INVOCATION AND SERVANT INTERFACES THAT PERMIT BOTH TYPECODE INTERPRETED AND COMPILED MARSHALING

(75) Inventors: Swee Boon Lim, Mountain View; Peter B. Kessler; David M. Brownell, both of Palo Alto, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/454,514

(22) Filed: Dec. 6, 1999

Related U.S. Application Data

(63) Continuation of application No. 08/673,181, filed on Jun. 26, 1996, now Pat. No. 6,032,199.

(51) Int. Cl.$^7$ ................................................ G06F 9/44
(52) U.S. Cl. ........................................................ 709/316
(58) Field of Search ................................ 709/310–320, 709/330

(56) References Cited

U.S. PATENT DOCUMENTS

| | | | |
|---|---|---|---|
| 5,577,251 A | 11/1996 | Hamilton et al. | 709/101 |
| 5,737,607 A | 4/1998 | Hamilton et al. | 717/1 |
| 5,758,186 A | 5/1998 | Hamilton et al. | 710/11 |
| 5,787,251 A | 7/1998 | Hamilton et al. | 709/203 |
| 5,815,708 A | 9/1998 | Kessler et al. | 709/318 |

FOREIGN PATENT DOCUMENTS

WO  0 643 349 A1  3/1995  ............. G06F/9/46

OTHER PUBLICATIONS

Peter B. Kessler, A Client–Side Stub Interpreter, Jan. 1994, Proceedings of the Workshop on Interface Definition Languages, Carnegie Mellon University.

Hamilton et al., Subcontract: A flexible base for distributed programming, Nov. 1993, Proceedings of 14$^{th}$ ACM Symposium on Operating Systems Principles.

Kougiouris et al., Support for Space Efficient Object Invocation in Spring, SunSoft, Inc.

IBM Technical Disclosure Bulletin, "Remote Procedure Call Stub Size Reduction Technique—Combining Parameter Code," vol. 36, No. 09B, Sep. 1993.

IBM Technical Disclosure Bulletin, "CALLOS2W," vol. 39, No. 04, Apr. 1996, pp. 91–96.

*Primary Examiner*—St. John Courtenay, III
(74) *Attorney, Agent, or Firm*—Beyer Weaver & Thomas, LLP

(57) ABSTRACT

Data structures, methods, and devices for facilitating servant invocation in a distributed client-server based object oriented operating system are disclosed. In one aspect of the invention, descriptor data structures, which contain a typecode indicator, a marshaling function identifier, and an unmarshaling function identifier, are used to enable modules of application code to be shared between different objects, thereby facilitating servant invocation by increasing the amount of commonized code in the operating system. In another aspect of the invention, a server invocation object is used in the execution of a method call. In still another aspect of the invention, a commonized code base is used to process typecode interpreted and compiled calls to a server process.

12 Claims, 19 Drawing Sheets

INVOKE( METHOD DESCRIPTOR        METHOD_DESC

INVOCATION DESCRIPTOR    INVOCATION_DESC

PARAMETER                IN_PARAM

PARAMETER                OUT_PARAM

CORBA_CONTEXT            TXT

CORBA_EXCEPTION          EXCEPTION_RETURN_PTR );

FIG. 7

TRANSPORT INDEPENDENT INVOCATION AND SERVANT INTERFACES THAT PERMIT BOTH TYPECODE INTERPRETED AND COMPILED MARSHALING

CROSS REFERENCE TO RELATED APPLICATIONS

This is a Continuation application of prior application Ser. No. 08/673,181 filed on Jun. 26, 1996 now U.S. Pat. No. 6,032,199, the disclosure of which is incorporated herein by reference.

U.S. Pat. Ser. No. 08/554,794, now U.S. Pat. No. 5,577,251 entitled "Method and Apparatus for SubContracts in Distributed Processing Systems," filed Nov. 7, 1995 as a continuation to Ser. No. 07/995,863, filed Dec. 21, 1992 (now abandoned), is related to the present application and is incorporated by reference herein in its entirety. Additionally, the following U.S. patent applications, all filed concurrently herewith, are related to the present application and are also incorporated by reference herein in their entirety: Ser. No. 08/670,682, now U.S. Pat. No. 6,044,224; Ser. No. 08/670,684; Ser. No. 08/670,700, now U.S. Pat. No. 6,189,048; and Ser. No. 08/669,782, now U.S. Pat. No. 5,991,823.

BACKGROUND OF THE INVENTION

1. Field of Invention

The present invention relates to the fields of distributed computing systems, client-server computing, and object-oriented programming. More particularly, the invention relates to data structures, methods, and devices for facilitating servant invocation.

2. Description of the Prior Art

A computing environment in which objects located on different computers are linked by a network is typically referred to as a client-server computing environment. Some of the computers act as providers of services or functionality to other computers. Others of the computers act as consumers of services or functionalities. The providers of service or functionality are known as "servers", and the consumers of the service or functionality are called "clients". The client-server model may also be generalized to the case where distinct programs running on the same computer are communicating with one another through some protected mechanism and are acting as providers and consumers of service or functionality.

Attempts to provide such a distributed system have been made using object-oriented methodologies that are based upon a client-server model in which server objects provide interfaces to client objects that make requests of the server objects. Typically, in such a distributed system, the servers are objects consisting of data and associated methods. The client objects obtain access to the functionalities of the server objects by executing calls on them, which calls are mediated by the distributed system. When the server object receives a call, it executes the appropriate method and transmits the result back to the client object. The client object and server object communicate through an Object Request Broker (ORB) which is used to locate the various distributed objects and to establish communications between objects. Distributed objects may exist anywhere in a network, as for example in the address space of the client, in multiple address spaces on the client machine, and in multiple machines across the network.

The software industry has responded to the need for a distributed object technology by forming the Object Management Group (OMG). The goal of the OMG is to define the Object Management Architecture (OMA), which has four major components: the Object Request Broker (ORB), Object Services, Common Facilities, and Application Objects. The Object Request Broker provides basic object communications and management services, thereby forming the basis of a distributed object system. A standard for an Object Request Broker is contained in the Common Object Request Broker Architecture (CORBA) specification from the OMG, Revision 2.0, dated July 1995.

In typical client-server systems, performance overhead can be costly. That is, the speed and quality of a process within the system may be compromised by inefficient uses of application code and methods associated with transmitting information between distributed objects. By way of example, the performance overhead associated with repeatedly extracting information, from buffers or portions of code, each time that information is required by the client-server system, is high. Further, as will be appreciated by those skilled in the art, client-server systems typically use separate interfaces for compiled invocation and non-compiled invocation. The use of separate interfaces is inefficient. Consequently, the provisions of methods, data structures and/or devices which reduce the performance overhead associated with communicating information between distributed objects would be desirable. Further, the provision of a mechanism that would enable common base code to be shared between compiled invocation and non-compiled invocation would provide for the improved performance of a client-server system.

SUMMARY OF THE INVENTION

To achieve the foregoing and other objects and in accordance with the purpose of the present invention, data structures, methods and devices for facilitating servant invocation in a distributed client-server based object oriented operating system are disclosed. In one aspect of the invention, descriptor data structures, which contain a typecode indicator, a marshaling function identifier, and an unmarshaling function identifier, are used to enable modules of application code to be shared between different objects, thereby facilitating servant invocation by increasing the amount of commonized code in the operating system.

In various embodiments of the invention, the descriptor data structure is a parameter descriptor data structure which may additionally include one or more of the following fields: a direction indicator to identify a processing direction of an entity associated with the descriptor data structure; a name indicator that provides a name for the entity associated with the descriptor data structure; and a size indicator that indicates the amount of memory that must be allocated by a process which is to receive the entity associated with the descriptor data structure. In other embodiments of the invention the descriptor data structure takes the form of an exception descriptor data structure that is used to describe an exception.

In another aspect of the invention, the exception descriptor data structure includes a typecode indicator and a throw function indicator arranged to identify a throw function arranged to specify the nature of an exception when the throw function is called. In some embodiments, the exception descriptor data structure also includes a repository identifier arranged to uniquely identify the exception associated with the exception descriptor data structure.

In another aspect of the invention, a server invocation object is used to facilitate communications between a requesting process and a servant object. A server invocation object includes a pointer arranged to identify an associated marshal buffer for the server invocation object, and pointers arranged to identify descriptor data structures associated with the server invocation object. In various embodiments, the server invocation object includes one or more of: a pointer to a context associated with the server invocation object; and a call-back closure which contains a pointer arranged to identify a call-back function-associated with the server invocation object.

In still another aspect of the invention, a method of calling an invoke method of a distributed client-server based object oriented operating system having a plurality of client representations that are associated with one of a local stub and a remote stub involves the use of a common code which includes the determination of whether the call, or request, to the invoke method is a typecode interpreted call or a compiled call. When the call is typecode interpreted, arguments in the call are marshaled using a typecode marshaling routine. When the call is compiled, arguments in the call are marshaled using a marshal method associated with the argument. In some embodiments, the call, or request, is transmitted over a selected transport to an endpoint associated with a server process. The received request is unmarshaled, processed and a reply is transmitted to the client process from the server process. The reply is encapsulated in the marshal buffer of the client, and the arguments are unmarshaled using the same descriptor data structures. In a preferred embodiment, the client and the server use the same descriptor data structures for their respective marshaling and unmarshaling functions.

BRIEF DESCRIPTION OF THE DRAWINGS

The invention, together with further advantages thereof, may best be understood by reference to the following description taken in conjunction with the accompanying drawings in which:

FIG. 7 is a representation of a call to an invoke method on the client side of a distributed object-oriented system in accordance with one embodiment of the present invention.

DETAILED DESCRIPTION OF THE INVENTION

Figure 1A:
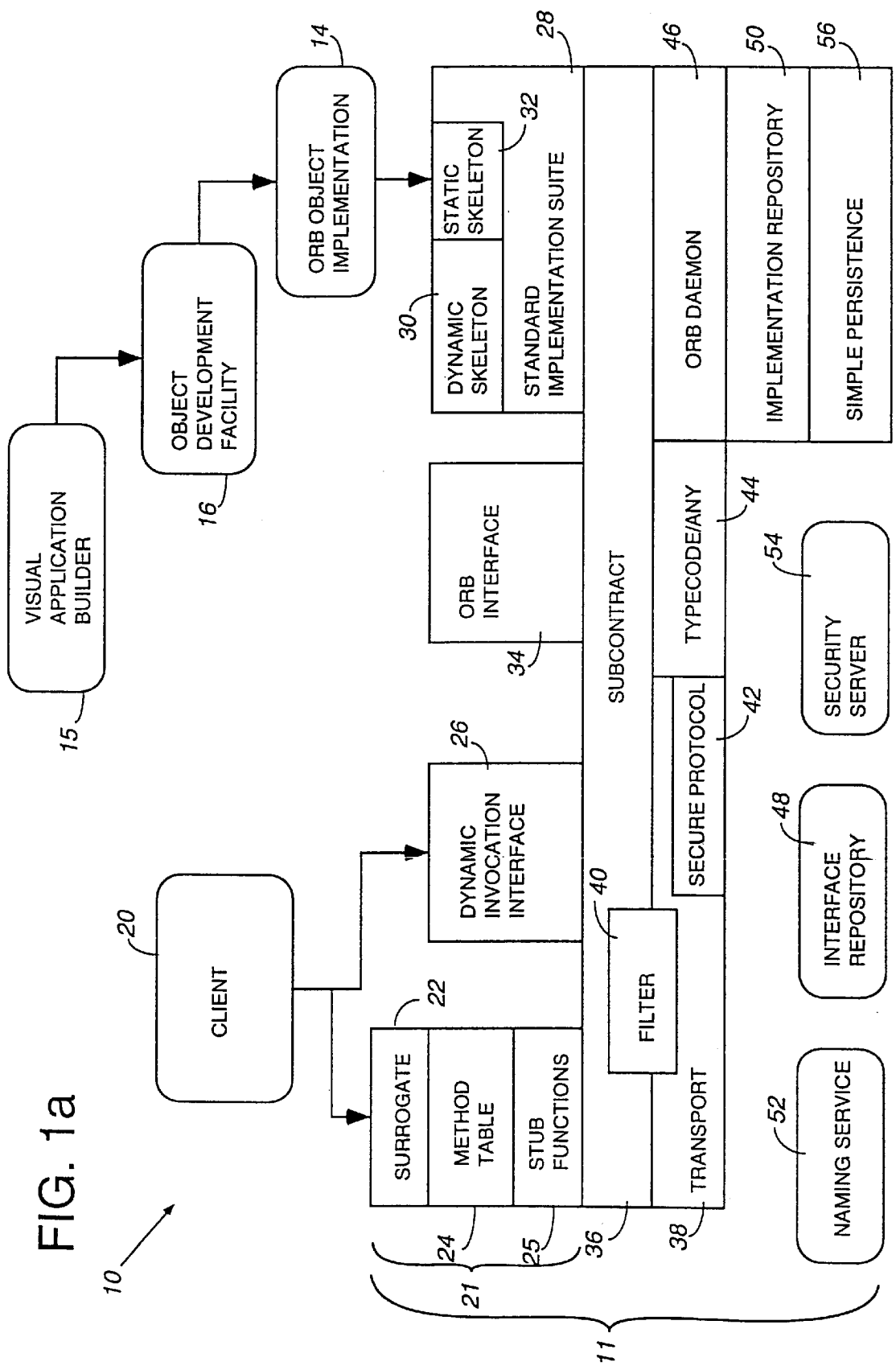
FIG. 1a is a symbolic overview of a distributed object-oriented system.
Figure 1B:
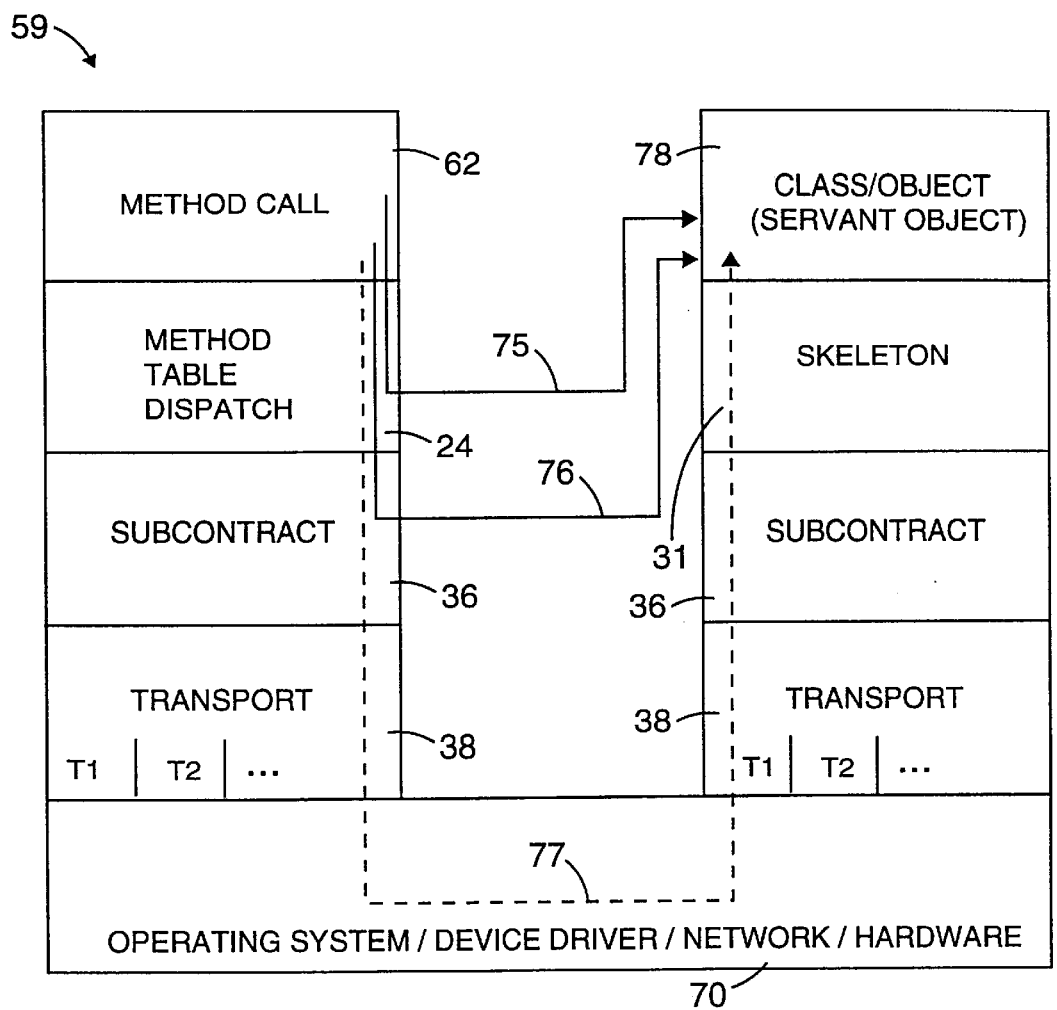
FIG. 1b is a diagrammatic illustration which represents how a request by a client may be routed through the architecture of a client side and a server side of a distributed object-oriented system, and the interface between the client side and the server side of the distributed object-oriented system.
Figure 2:
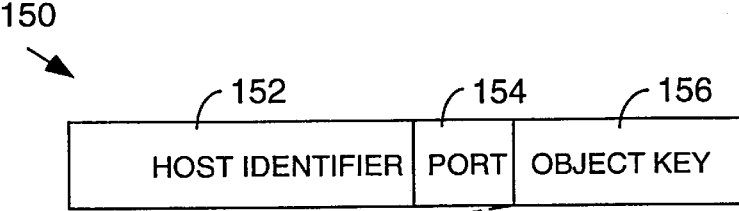
FIG. 2 is a diagrammatic representation of an object reference.
Figure 2:
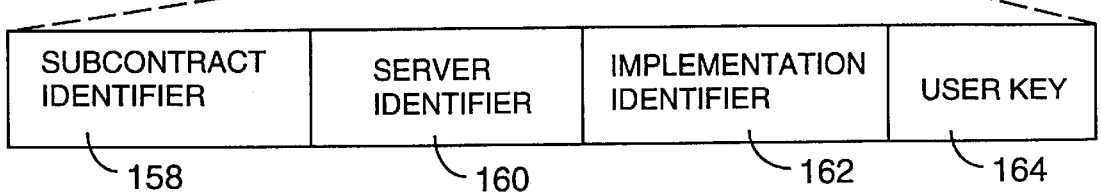

The present invention is directed toward distributed object systems and will be described with reference to several preferred embodiments as illustrated in the accompanying drawings. The invention may be practiced within the context of any suitable distributed object system, including those defined under CORBA or any other suitable specification. However, for purposes of illustration, the present invention will be described primarily within the context of an Object Request Broker (ORB) implemented under the CORBA specification from the Object Management Group (OMG), Revision 2.0, dated July 1995, which is incorporated herein by reference. FIG. 1a diagrammatically illustrates the overall architecture of a representative distributed object system suitable for implementing the present invention. FIG. 1b diagrammatically illustrates some possible flow paths that a request from a client to a servant object may follow within such an architecture that includes a three level dispatch mechanism. FIG. 2 shows one object reference data structure that may be used by a client to refer to a servant object.

A distributed object system 10 typically includes an Object Request Broker (ORB) 11 as is symbolically illustrated in FIG. 1a. ORB 11 provides all of the location and transport mechanisms and facilities necessary to deliver a call from a client to a servant (target object) and to return a response to the client, as will be discussed below with reference to FIG. 1b. The client and servant may be located in the same process, in different processes on the same machine, or on completely different machines. For the purposes of this discussion, client 20 may be any code that invokes an operation on a distributed object and thus may or may not take the form of a distributed object or a process. A distributed object may have a wide variety of representations. By way of example, an object may be a C++ object that has been provided by an application developer. Alternatively, an implementation for an object may be developed within a visual application builder 15. This visual application builder allows a developer to visually select existing object types from a catalog and graphically connect the services provided by one object to the services needed by another (attributes, arguments, results etc.) in order to create a new implementation for an object.

An object development facility 16 may be used to simplify the creation and the installation of distributed objects. It is used to "wrap" or encapsulate developer objects in distributed object code. As such, object development facility 16 may be used to transform a developer object into an ORB object implementation 14. In this example, ORB object implementation 14 is presented as a server as shown by its location in the diagram. A developer uses an interface definition language to define an interface for an ORB object, provides a developer object implementation that implements that object's behavior, and then uses the object development facility 16 in order to produce an ORB object implementation 14. At run time, an instance of this ORB object (a servant object) is created that will utilize this ORB object implementation 14. It should be appreciated that the object development facility may also be used to create objects that take the role of clients at some point.

Client 20 communicates with a servant by way of a stub 21, a subcontract layer 36, possibly a filter 40, and a transport layer 38. Stub 21 includes a surrogate 22, a method table 24 and stub functions 25. Client 20 communicates initially with surrogate 22 that appears to the client as the server object. Alternatively, client 20 may communicate directly with the server object through a dynamic invocation interface (DII) 26 instead of through surrogate 22, method table 24 and stub functions 25. Dynamic invocation interface 26 is used to enable clients to construct dynamic requests. One procedure by which a client may make a call to a servant utilizing the above layers is described in more detail below with reference to FIG. 1b.

Subcontract layer 36 provides the functionality required by an object in order to utilize subcontracts to implement various services (or features or object mechanisms) named by a particular subcontract, as described in greater detail in above-referenced U.S. patent application Ser. No. 08/554, 794, filed Nov. 7, 1995. A subcontract identifies a quality of service provided by the distributed object system that may be utilized by an individual object. For example, a subcontract may identify that the feature of security is to be used for a particular object. A technique by which a particular subcontract may be associated dynamically at run time with a servant object is, described in above-referenced U.S. patent application Ser. No. 08/670,682, now U.S. Pat. No. 6,044, 224. Filter 40, if being used, may perform a variety of tasks, such as compression, encryption, tracing, or debugging, that are to be applied to communications to and from an object.

Transport layer 38 operates to marshal, unmarshal and physically transport information to and from a servant that typically does not share the same process as a client. A technique for marshaling/unmarshaling an object reference is described in above-referenced U.S. patent application Ser. No. 08/679,681, now U.S. Pat. No. 6,044,409.

A standard implementation suite 28 (or object adapter) represents a set of subcontracts that interact with ORB objects 14 in identical ways, as for example object key management. One such implementation suite is described in above-referenced U.S. patent application Ser. No. 08/669, 782, now U.S. Pat. No. 5,991,823. It should be noted that a subcontract may belong to multiple implementation suites. Also, implementation suites may utilize different subcontracts. A skeleton, that may take the form of either static skeleton 32 or dynamic skeleton 30, is used to transform requests into a format required by a servant object 78 (as will be explained in more detail below with reference to FIG. 1b). Thus, skeletons 30 and 32 call an appropriate servant object 78. Static skeleton 32 is used to call interface-specific object implementations 14, while dynamic skeleton 30 is used generically when interface-specific objects are not available.

An ORB daemon 46 is responsible for ensuring that object servers are active when invoked by clients. A technique for starting object servers is disclosed in U.S. patent application Ser. No. 08/408,645 which is hereby incorporated by reference. Secure Protocol 42 is a secure interoperability protocol that secures the internet inter-ORB protocol and helps to transmit information through transport layer 38 in a secure fashion. This may mean integrity protection, confidentiality, etc. The internet inter-ORB protocol is a protocol that typically communicates between processes on different machines. However, in some cases, the internet inter-ORB protocol may communicate between process on the same machine. The security server 54 is a security administration server that secures the services that are used between processes on different computers.

Typecode/Any module 44 implements "Typecode" and "Any" objects. Typecode describes an Interface Definition Language (IDL) data type, allowing type descriptions to be transmitted between clients and servers. An instance of an IDL data type may be encapsulated by an Any object. An Any object refers to typecode of the encapsulated data, and a generic encoding of the data.

An implementation repository 50 is used to store information relating to object servers. Specifically, implementation repository 50 stores the information needed to start a server process. For example, implementation repository 50 stores information such as the location of the server program, any arguments to the program, and any environment variables to pass to the program, etc.

Simple persistence 56 uses an Interface Definition Language (IDL)-defined type and the output from running that IDL type through the DL compiler, together with a portion of additional code so that an IDL-defined type can be read from, and written to, disk. A naming service 52 is used to name ORB objects. A client may use naming service name server 52 to find a desired object by name. Name server 52 returns an object reference, that in turn may be used to send requests to that object. An Interface Repository 48 (IFR) knows about all interfaces for all objects within the distributed object system.

A request made by a client using a method table ("m-table") dispatch will pass through a variety of the aforementioned layers of the architecture on its way to the servant as diagrammatically illustrated in FIG. 1b. The request is initiated by a client and may take any suitable form. The form of the request will depend to a large extent upon the nature of the programming language used to create the client. By way of example, if the client is written in the C++ language, the request may take the form of a C++ method call 62. The call is made to a designated object reference taking the form of a surrogate. The surrogate includes methods that comply with the object's interface.

As will be appreciated by those skilled in the art, the object reference used at different locations within a distributed object system may vary significantly in appearance. In the embodiment described, the client side object reference is a dual pointer (referred to herein as a "fat pointer"). A fat pointer contains two distinct pointers. A first pointer, or location indicator, points to a client representation ("client rep") associated with the referenced object. A second pointer, or location indicator, points to a method table of the method table dispatch 24 that is associated with the referenced object. It should be appreciated that as used herein, the term "pointer" is used to identify not only locations in computer or network memory, but also to refer to a location indicator in general. A client representation is an object that has methods that support invocation as well as CORBA defined "pseudo" object reference operations. These operations include, but are not limited to, a "duplicate" method, a "release" method, a "narrow" method, a "hash" method, and an "is equivalent" method.

After the client has initiated a call, the call is processed using a method table dispatch mechanism 24. Such a technique is disclosed in U.S. patent application Ser. No. 08/307, 929 and is hereby incorporated by reference. The method table dispatch mechanism uses a method table that contains a list of pointers to stub functions 25, one of which is associated with the method to be invoked. Stub functions 25 receive a function or procedure call in the "native" language of the client process, then use either a subcontract layer 36 or a native call to eventually call the corresponding servant object. The native language may be any suitable language, as for example a language such as C++.

Method table dispatch 24 determines the appropriate one of the stub functions 25 to process the method call, and then pairs the method call with the appropriate stub function. In the event that the client making the method call is in the same process as the servant object, a local stub function is called. The local stub function sends the method call directly to servant object 78. A technique for routing calls within a local process is described in above-referenced U.S. patent application Ser. No. 08/670,684. Alternatively, if the servant object is in a different process, i.e. a remote process, a remote stub function is called. The remote stub function invokes the client representation, that delivers the invocation to servant object 78.

Subcontracts implemented by subcontract layer 36 are logic modules that provide control of the basic mechanisms of object invocation and argument passing that are important in distributed object systems. A subcontract implemented by subcontract layer 36 determines a specific quality of service for use by an object. A subcontract is uniquely identified by a subcontract identifier, that is typically embedded in an object reference. A quality of service is a set of service properties. Among possible service properties that are selectable are qualities relating to server activation, security, transactions, filterability, and clean shut-down. Subcontracts are configured such that certain qualities of service are available. With predetermined qualities of service, the overhead associated with processing individual service properties is reduced. Realistically, only "reasonable" or commonly used combinations of service properties are supported with subcontracts. However, subcontracts may be created to meet the specific requirements of a given distributed object system.

The identification of an appropriate subcontract in subcontract layer 36 may be thought of as the identification of a desired function that is unique to that subcontract. For example, a marshal function or an unmarshal function is defined for each subcontract. A subcontract marshal function is used by a stub to marshal an object reference so that it may be transmitted to another address space, or domain. The object reference is typically processed by a transport mechanism in transport layer 38.

A transport mechanism such as T1, T2, etc., that is a part of the transport layer 38, is used to marshal and physically transport information to and from servant objects. Information, i.e. the object reference or the request, is converted into protocols appropriate to a given domain. By way of example, protocols may include, but are not limited to, Ethernet protocols and general inter-ORB protocols (GIOPs). In some uncommon cases, protocols may even entail the use of electronic mail to transmit instructions to be implemented on a server. After information is marshaled, the transport mechanism then transports information through any combination of an operating system, a device driver, or a network, that are all a part of hardware 70 used by the client side of a distributed object system.

While transport mechanisms require a conversion of information into a protocol appropriate to a given domain, some transport mechanisms to do not require the encoding of information for different domains. One transport mechanism that does not require a conversion of information into a protocol appropriate to a domain other than the one on which information originates is termed a "door". Doors are essentially gateways between two different processes on the same host. The use of doors eliminates the need for a conversion of information into a canonical implementation in transport layer 38, as there is no need to encode information into a protocol that may be used by a different machine by virtue of the fact that information is remaining on the same host and therefore does not require a change of domain. Hence, information may simply be "flattened out," or marshaled into a stream that is not encoded for use by a different machine, and passed between the two processes on the host.

Once information is transported through hardware 70 used by the client side, the information is then transported to hardware 70 on the server side of a distributed object system. Once information is routed through hardware 70, the server side of a distributed object system invokes a transport mechanism such as T1, T2 etc. to receive information on an end point that is a part of transport layer 38. In the event that an end point is not created by transport layer 38, transport layer 38 provides the functionality needed for the end point to be created by subcontract layer 36. By way of example, a dedicated end point is typically created by subcontract layer 36, while cluster end points, which typically include network and TCP/IP end points, are typically created by transport layer 38. Regardless of whether end points are created by subcontract layer 36 or transport layer 38, end points "live in," i.e. are a part of, transport layer 38. End points are essentially ports that receive information from a different domain. After an end point in transport layer 38 receives information transported from a different domain, the end point then dispatches the information from transport layer 38 to subcontract layer 36. Subcontract layer 36.then dispatches the information to the skeleton and the servant. Such a technique for performing this three-level dispatch is described in above-referenced U.S. patent application Ser. No. 08/670,700, now U.S. Pat. No. 6,189,048.

Subcontract layer 36 provides the functionality to unmarshal at least some of the information it has received. That is, subcontract layer 36 unmarshals at least part of the request. Then, the request is dispatched to a skeleton 31 that transforms the request into an implementation specific format required by servant object 78. The skeleton may either be a static skeleton or a dynamic skeleton as described above.

In general, a remote request is routed through the client side and the server side as described above. The method call 62 is received, method table dispatch layer 24 is used to identify an appropriate subcontract prior to the selection of a transport mechanism in transport layer 38 that marshals the request and prepares it for transport to another domain. Through hardware 70, the marshaled request is transported to the server side where it is received on an end point that is a part of transport layer 38. An appropriate end point receives information transported across a wire, and information is dispatched from transport layer 38 to subcontract layer 36, that provides the functionality to at least partially unmarshal the information it has received. The subcontract layer then dispatches the request to skeleton 31 that transforms the request into a specific format required by servant object 78. This path is shown by arrow 77, and is the path that may be taken by both remote and local requests.

However, if a client and a server are in a local process, i.e. both the client and the server are in the same process, the use of the path shown by arrow 77 as described above is unnecessarily complex. If it is known that the client and the server are in the same process, it is possible to shorten the invocation path, or flow path of a request for service. If a local process may be identified when an object reference is created, shortened flow paths, i.e. the paths represented by arrows 75 and 76, may be taken to send a request from a client to a server that are on the same host. The path represented by arrow 76 is more likely to be taken, as it uses subcontract layer 36 to identify an appropriate subcontract. However, in situations in which an appropriate subcontract does not need to be explicitly identified, the path represented by arrow 75 may be taken.

FIG. 2 will now be used to describe an embodiment of an object reference. As will be familiar to those skilled in the art, object references may take a variety of forms depending upon the location within the process that they are being held at any given time. However, by way of background, a representative object reference for use in a system that utilizes a low overhead implementation suite is illustrated in FIG. 2. In the implementation shown therein, object reference 150 includes a host identifier 152, a port designation 154, and an object key 156. Object key 156 includes a subcontract identifier 158, a server identifier 160, an implementation identifier 162, and a user key 164. Host identifier 152 denotes a particular computer in a network, while port designation 154 identifies the port of the selected computer that is to be used for communication. Object key 156 provides further identifying information used in order to locate a desired servant object on its host machine.

Server identifier 160 names a particular process or program in which the servant object resides, while user key 164 is a unique number or string used to locate the servant within the process named by server identifier 160. Subcontract identifier 158 is used to attach the protocol of a particular subcontract and its associated services with a servant, and implementation identifier 162 names an implementation of an interface that is to be used with that servant object.

Reducing the amount of application code used by a distributed object-oriented system, i.e. a distributed operating environment, without compromising the performance of the system would serve to increase the overall efficiency of the system. One way to reduce the amount of application code used in a distributed object-oriented system is to commonize as much code as possible. In other words, using the same code to perform different tasks, wherever possible, would enable the total amount of application code to be reduced while increasing the overall efficiency of the system. Further, fewer code paths imply that the code will both be easier to test and have less potential for hidden bugs in less common features. By way of example, a relatively large proportion of a less common feature like dynamic invocation may be tested when static invocation, which is a feature that is more common, is tested. The remainder of the dynamic invocation feature, which may include one or two minor routines, may be tested independently.

One area in which commonized code may be implemented is in the area of calling a method. Calls to methods in a client-server system typically entail the specification of a method, and information required to invoke the method, including various interface parameters used by the method and exceptions thrown by the method. Typically, code that is generated relating to each parameter is directed directly towards each method which uses the parameter. Since multiple methods may use the same parameters, the efficiency of a system may be improved if code which relates to a parameter is encompassed in a "module" or a data structure. This module of code may then be accessed by more than one method, thereby reducing the amount of code in a system.

Another area in which commonized code may be implemented is in the area of marshaling and unmarshaling. Marshaling a packet of information entails preparing the information for transfer over a "wire," or a network communications line. Unmarshaling a packet of information is essentially the process of reversing the marshaling procedure, thereby producing a packet of information which is meaningful in a non-network environment. There are two general types of marshaling and two general types of unmarshaling, namely compiled marshaling or unmarshaling and non-compiled, or typecode interpreted, marshaling and unmarshaling. Isolating the differences between compiled, or interface definition language (IDL) generated, and non-compiled marshaling and unmarshaling routines would enable a common code base to be created for use with the portions of the routines which are not different. That is, a generic marshal routine and a generic unmarshal routine may be created. The use of generic routines makes the testing of code easier, thereby reducing the potential for hidden bugs which may exist in less common features.

In general, as mentioned above, a call to invoke an object involves specifying a method to be invoked, specifying parameters associated with the method to be invoked, and specifying any exceptions associated with the method to be invoked. Data structures may be utilized in order to commonize code. Data structures may further be utilized to enable changes relating to a parameter, for example, to be made without affecting the overall invocation of a method which uses the parameter to which changes are made. In other words, the use of data structures enables changes to be made to one element associated with a call to invoke an object without requiring, for example, significant changes to be made to application software. Data structures which may be used to invoke an object include, but are not limited to, a method descriptor data structure, an invocation descriptor data structure, a parameter data structure, and an exception data structure.

Figure 3:
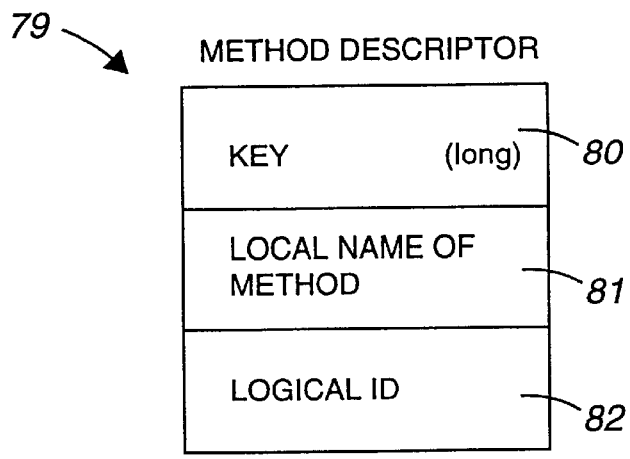
FIG. 3 is a diagrammatic representation of a method descriptor in accordance with one embodiment of the present invention.

Referring next to FIG. 3, there is shown a diagrammatic representation of a method descriptor 79 suitable for use with the present invention. Method descriptor 79 is one of many descriptor data structures, and is used to describe a particular method that is to be called, or invoked. Typically, method descriptor 79 describes a remote procedure method. Both the client side and the server side of a distributed object-oriented system use method descriptor data structures 79. In the embodiment shown, the method descriptor data structure 79 includes a key 80, a local name 81 of the method which is to be invoked, and a logical identifier (ID) 82 for the method to be invoked. Key 80 may take any suitable form, as for example, the hash value, or the numerical value, of local name 81, which is a string of characters. The hash value of local name 81 may be used to generate a method number, which while it is not unique, may be used to identify an associated method. Local name 81 of the method which is to be invoked is a non-scoped name, and serves to identify the client with which the method descriptor is associated. Logical ID 82 is a unique name for the associated method. That is, logical ID 82 serves as a global identifier for the method.

The advantage of providing key 80 in addition to local name 81 of the method and logical ID 82 in the method descriptor stems from the fact that key 80 has a numerical value, whereas local name 81 of the method and logical ID 82 are typically strings of characters. Numerical values may be compared, decoded, and dispatched much more quickly than values which are strings of characters.

While method descriptor 79 contains information relating to a method, it does not contain information which describes the actual invocation of the method. Accordingly, an invocation descriptor is provided to describe the actual invocation of the method. An invocation descriptor is a data structure which is used to provide information that is pertinent to the invocation of a method. In other words, an invocation descriptor is a collection of all information related to a given remote procedure method described by a method descriptor.

Figure 4:
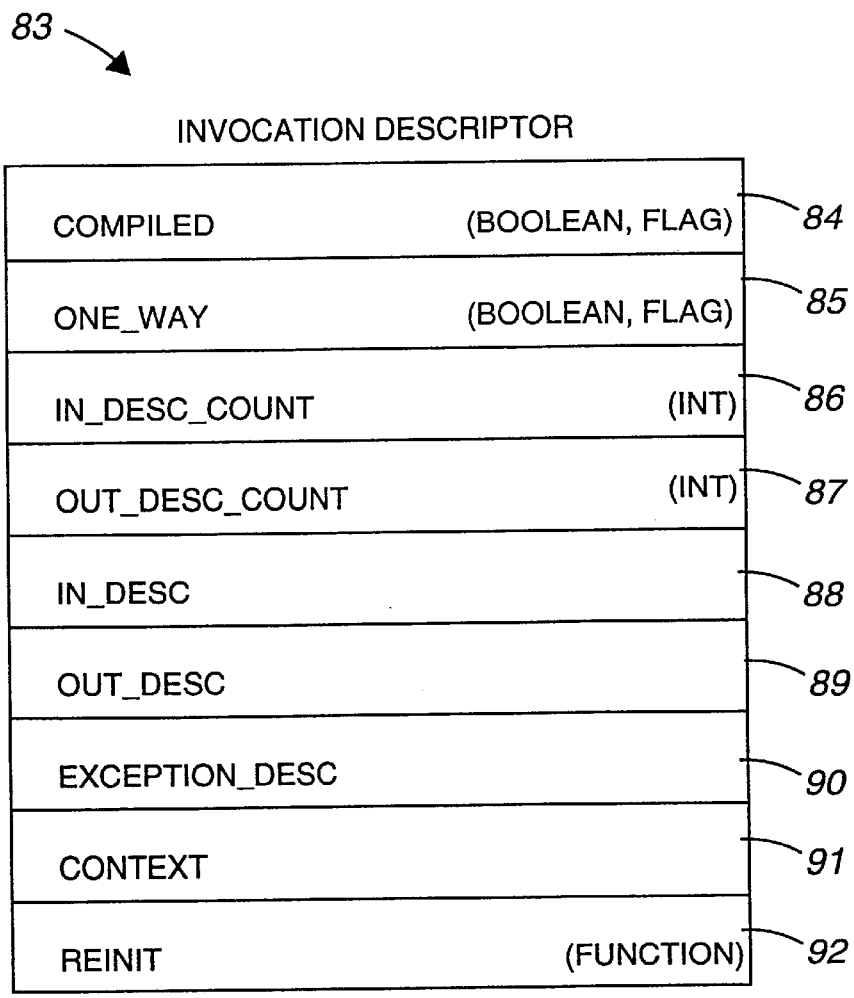
FIG. 4 is a diagrammatic representation of an invocation descriptor in accordance with one embodiment of the present invention.

FIG. 4 is a diagrammatic representation of an invocation descriptor 84 in accordance with one embodiment of the present invention. Invocation descriptor 84 may include a combination of boolean values, integer values, a context, pointers to other data structures, and pointers to functions. It should be appreciated that pointers may be replaced by generic identifiers, i.e. any means of identifying appropriate data structures or functions. Herein, the terms pointer and identifier will be used interchangeably. Boolean values, or logical flags, include a "compiled" flag 84 and a "one-way" flag 85. Compiled flag 84 identifies whether the invocation path is static, i.e. compiled, or dynamic, i.e. typecode interpreted. A dynamic invocation path is also known as a non-compiled invocation path. One-way flag 85 identifies whether a reply is in response to a request. Integer values include an "in" descriptor counter 86 (IN_DESC_COUNT) and an "out" descriptor counter 87 (OUT_DESC_COUNT). The counters hold values which represent the number of "in" parameters and the number of "out" parameters, respectively, associated with a particular invocation.

Invocation descriptor 83 represented in FIG. 4 includes pointers to other data structures, namely a pointer to an "in" descriptor 88 (IN_DESC), a pointer to an "out" descriptor 89 (OUT_DESC), and a pointer to an exception descriptor (EXCEPTION_DESC). IN_DESC 88 and OUT_DESC 89 are pointers to parameter descriptors, which will be discussed in detail below with respect to FIG. 5. IN_DESC 88 and OUT_DESC 89 may each be a pointer to an array of parameter descriptors. EXCEPTION_DESC 90 is a pointer to an array of pointers to exception descriptors, and will subsequently be described with respect to FIG. 6. IN_DESC_COUNT 86 (OUT_DESC_COUNT 87) and IN_DESC 88 (OUT_DESC 89) implement an ordered, counted collection of parameter descriptors and may be implemented using other suitable data structures.

The invocation descriptor shown in FIG. 4 also includes a context 91. A context, as for example context 91, may in general be an array of associated strings containing information which is relevant to the method to be invoked. The information contained in a context may be information useful to the implementation of the method to be invoked. A context is conceptually a list of associations. Each association typically includes a key, which is a string, and a value, which is also a string, that is associated with the key.

A pointer to a reinitialization function 92 (REINIT) is included as a part of invocation descriptor 83 represented in FIG. 4. The reinitialization function frees all stored pointers, and serves to clear associated buffers once data in the buffers has been processed. By way of example, if the method to be invoked is a marshal method, which is a method of preparing information for transfer over a network communications line, the reinitialization function clears an associated parameter at some point after the information in the parameter has been marshaled.

Figure 5:
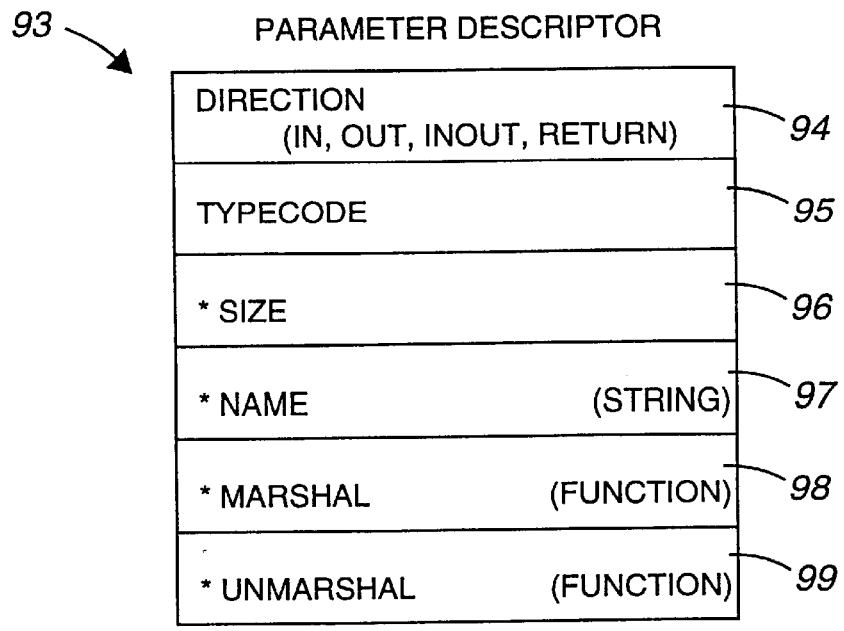
FIG. 5 is a diagrammatic representation of a parameter descriptor in accordance with one embodiment of the present invention.

Referring next to FIG. 5, there is shown a diagrammatic representation of a parameter descriptor 93 in accordance with one embodiment of the invention. Parameter descriptor 93 is a data structure which is arranged to describe the characteristics associated with a given parameter, and is itself associated with an invocation descriptor through the in descriptor (IN_DESC) and the out descriptor (OUT_DESC) as described with respect to FIG. 4. Parameter descriptor 93 may include a direction 94 and typecode 95, and may additionally include any combination of a size code 96, a name 97, a pointer to an associated marshal function 98, and a pointer to an associated unmarshal function 99. Direction 94 is an indicator which identifies a processing direction of the given parameter. Direction 94 may also be referred to as a mode. The processing directions are, from the frame of reference of a client, an "in" direction, an "out" direction, an "inout" direction, and a "return" direction. The in direction is an indication that the given parameter may be an argument that is provided by the client to the server, whereas the out direction is an indication that the given parameter may be an argument that is provided by the server to the client. It follows that the inout direction is an indication that the given parameter may be an argument that is transmitted in both an in direction and an out direction. The return direction is an indication that the given parameter may be an argument in a return from a call. In other words, the return direction is a special case of the out direction.

As described above, parameter descriptors, as for example parameter descriptor 93, are associated with invocation descriptors. Specifically, parameter descriptors are indirectly pointed to by the IN_DESC and OUT_DESC pointers which are included in an invocation descriptor, as mentioned above with respect to FIG. 4. IN_DESC is generally a pointer to an array of parameter descriptors with a processing direction which is an in direction or an inout direction, while OUT_DESC is generally a pointer to an array of parameter descriptors with a processing direction which may either be an out direction or a return direction.

Typecode 95 contains specifications which describe a particular data type, in this case, the data type of a parameter, although typecode 95 does not include information regarding the processing direction of the parameter. Typecode 95 includes pointers to marshal and unmarshal functions, or methods. Marshal functions were previously described with respect to FIG. 4. An unmarshal function is a function which reverses the marshaling procedure to produce an instance of the data type which is meaningful in the domain in which the data type is to be used. Typecode 95 also includes information pertaining to the size of the data type, or, in other words, the amount of memory each instance of the data type requires. It should be appreciated that the main purpose of typecode 95 is to describe a data type or, more specifically, the structure or constituents of the data type.

As typecode 95 includes pointers to marshal and unmarshal functions, information regarding the name and constituent elements of a data type, and the size, or amount, of memory required by an instance of the data type, it is not necessary to specifically include pointers to marshal and unmarshal functions, and a value relating to the size of the data type as a part of the parameter descriptor. However, explicitly providing information which may be extracted from typecode 95 in parameter descriptor 93 is advantageous in that it eliminates the performance penalty associated with extracting the information each time it is needed or desired. By way of example, computing the size of a data type via typecode 95 is expensive, as it may involve recursive computation of sizes of constituent types and summing the results. Hence, as previously described, parameter descriptor 93 may explicitly include information pertaining to size 96 of an associated parameter, and name 97 of the parameter, as well as pointers 98 and 99 to the marshal and unmarshal functions, respectively, of the parameter, in addition to direction 94 and typecode 95 of the parameter.

Figure 6:
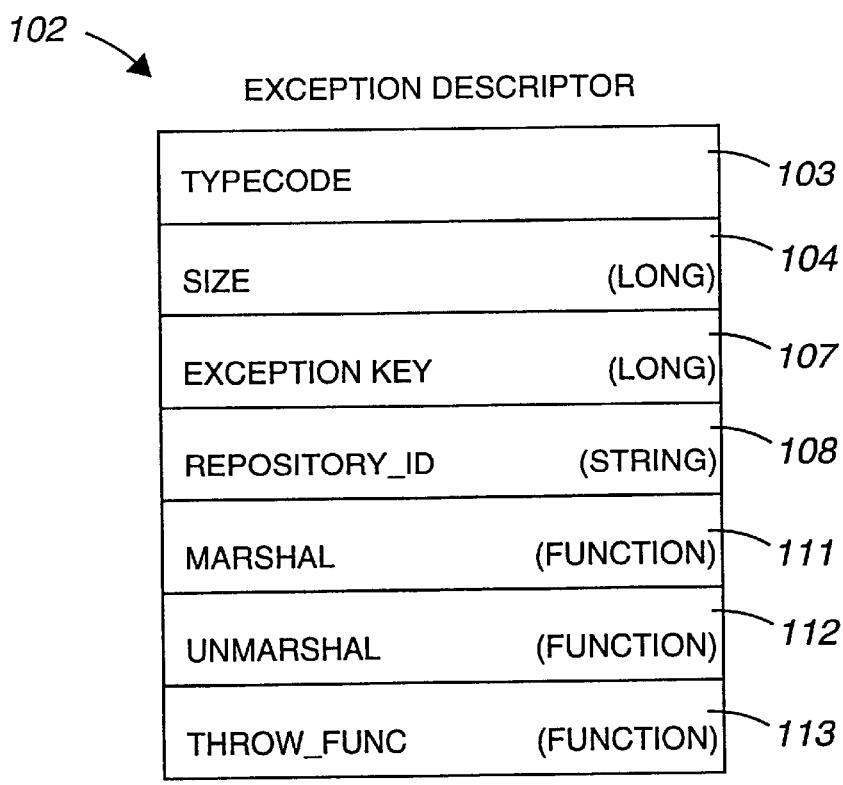
FIG. 6 is a diagrammatic representation of an exception descriptor in accordance with one embodiment of the present invention.

Referring next to FIG. 6, there is shown a diagrammatic representation of an exception descriptor 102 in accordance with one embodiment of the invention. Exception descriptor 102 is a data structure arranged to describe the characteristics of an associated exception. Like the parameter descriptor described above, exception descriptor 102 is associated with invocation descriptors, and is indirectly pointed to by the EXCEPTION_DESC pointer mentioned above with reference to FIG. 4. Exception descriptor 102 may include typecode 103, and may also include explicitly specified information pertaining to any combination of a size 104, a key 107, a repository identifier 108, a pointer to an associated marshal function 111, a pointer to an associated unmarshal function 112, and a pointer to a throw function 113. While the parameter descriptor described above includes a direction, exception descriptor 102 does not, as the processing direction is always from the server to the client. In other words, an exception is always transmitted from the server to the client.

As described above with reference to FIG. 5, typecode 103 contains specifications which describe a particular data type, including pointers to marshal and unmarshal functions associated with the data type. Referring back to FIG. 6, the entity in this case is an exception. In addition to including pointers to the marshal and unmarshal functions associated with the exception, typecode 103 includes information relating to the size of the exception, or the amount of memory which must be allocated by a process which is receiving the exception. Typecode 103 further includes a repository identifier (REPOSITORY_ID). The repository identifier further serves to uniquely identify the exception. The repository identifier is somewhat analogous to the LOGICAL_ID of the method descriptor as described above with respect to FIG. 3, and may be used to uniquely identify an exception within an exception repository, or a "listing" of all exceptions. Finally, typecode 103 includes a pointer to a throw function (THROW_FUNC) which specifies the nature of the exception, and is used to reroute a request in the event of an exception. It should be appreciated that although only information in typecode 103 which is specifically relevant to the exception descriptor has been described, typecode 103 may generally contain a great deal more information than described.

As was the case with the parameter descriptor described above with respect to FIG. 5, exception descriptor 102 as described with respect to FIG. 6 may explicitly include information which may be extracted from typecode 103. Again, this information, namely any combination of size 104 of the exception, key 107, repository identifier 108, pointer to the associated marshal function 111, and pointer to the associated unmarshal function 112, may be explicitly included in exception descriptor 102 to avoid the performance penalty assessed each time the information is extracted from typecode 103.

The four descriptor data structures described in FIGS. 3 through 6 are interrelated. Parameter and exception descriptor data structures are generated by a compiler routine in a distributed object-oriented system at start-up. That is, the parameter and exception descriptor data structures are automatically filed at compile-time. Method and invocation descriptor data structures, on the other hand, may either be created at start-up and automatically filed at compile-time, or they may be created at run-time. An invocation descriptor includes pointers to arrays of parameter descriptors and arrays of pointers to exception descriptors. The relationship between a method descriptor and the remaining three data structures may best be understood with reference to FIG. 7, which is a representation of a call to an invoke method on the client side representation of a distributed object in accordance with one embodiment of the present invention. The call to an invoke method involves including as arguments a pointer to a method descriptor, a pointer to an associated invocation descriptor, pointers to arrays of parameter addresses or storage locations, a CORBA context, and a CORBA exception. The method descriptor and the invocation descriptor are interrelated in that both are a part of the call to an invoke method. Although a method descriptor and an invocation descriptor may be combined into a single descriptor data structure, they remain separate due to the fact that although both the client side and the server side of a distributed object-oriented system use the method descriptor, on the server side, information in the method descriptor and information in the invocation descriptor comes from different places in the overall system. The lists of parameter addresses change with every call to the invoke method, and serve in part to provide memory locations from which to get "in" arguments and in which to store "out" arguments. The parameter storage location arrays are step up by stubs and skeletons, which were described above with reference to FIG. 1b. The CORBA exception storage exception descriptor provides a pointer to an exception return pointer. This pointer to an exception return pointer indicates where to store the pointer to an exception. If the pointer to an exception return pointer is null, an exception return is thrown.

Figure 8:
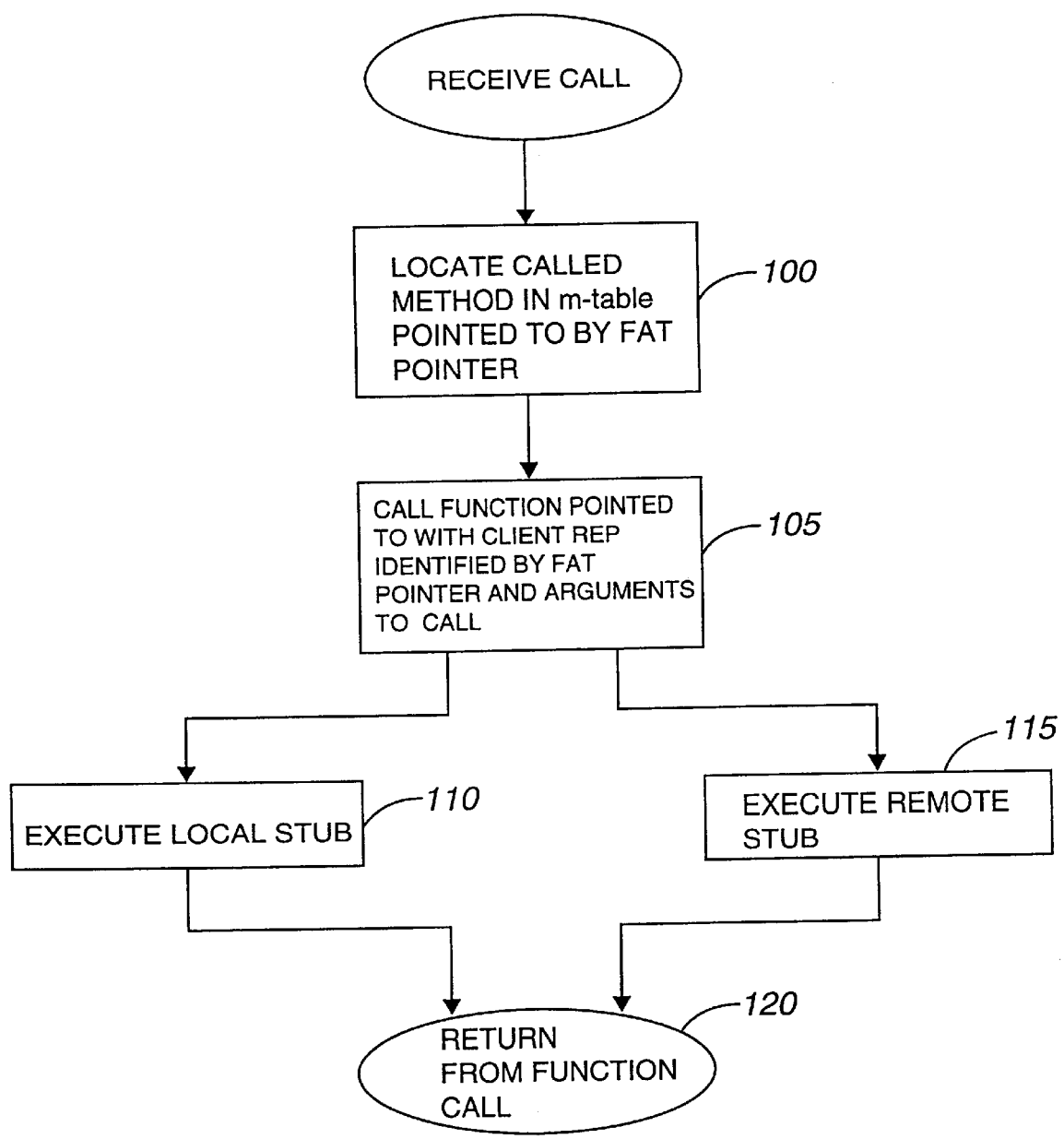
FIG. 8 is a process flow diagram which illustrates steps involved with an invocation of an object in accordance with one embodiment of the present invention.

Referring next to FIG. 8, a method of invoking an object will be described in accordance with one embodiment of the present invention. That is, the steps which occur once a call is made to invoke a method are shown in the diagram. Initially, a call or a request, which uses a fat pointer, is received by a client. Although the call may be in any suitable computer language, in the described embodiment, the call is a C++ call. A fat pointer may be thought of as a "large" pointer, or a pointer structure, which contains at least two "normal" pointers. A fat pointer may also be considered to be a CORBA object reference. In a fat pointer with two "normal" pointers, the fat pointer typically contains eight bytes, while the normal pointers typically contain four bytes each. The fat pointer is comprised of a representation pointer "rep" and a method table, or m-table, pointer, each of which is a normal pointer. The representation pointer points to a client representation, or client "rep", and may be considered to be a pointer to a subcontract entity which represents a distributed object on the client.

In step 100, the called method is located in the m-table pointed to by the fat pointer. If the called method is a local method, then the m-table pointed to by the fat pointer is a local m-table. Similarly, if the called method is a remote method, then the m-table pointed to by the fat pointer is a remote m-table. In step 105, a call to the function pointed to with the client representation identified by the fat pointer and arguments to the C++ call is made. After the function is called, process control branches off to different functions depending upon whether the function pointed to is in a local process or a remote process. If the function pointed to is in a local process, process control proceeds to step 110 in which a local stub is executed. The steps associated with executing a local stub are discussed in detail in co-pending patent application 08/670,684, filed concurrently herewith. After the local stub has been executed in step 110, the process returns from the function call in step 120. If the function pointed to by the fat pointer is in a remote process and not in a local process, process control advances to step 115 after the function is called in step 105. In step 115, a remote stub is executed. The process of executing a remote stub will be discussed in detail below. After the remote stub has been executed in step 115, process control proceeds to step 120, which is the return from the function call.

Figure 9:
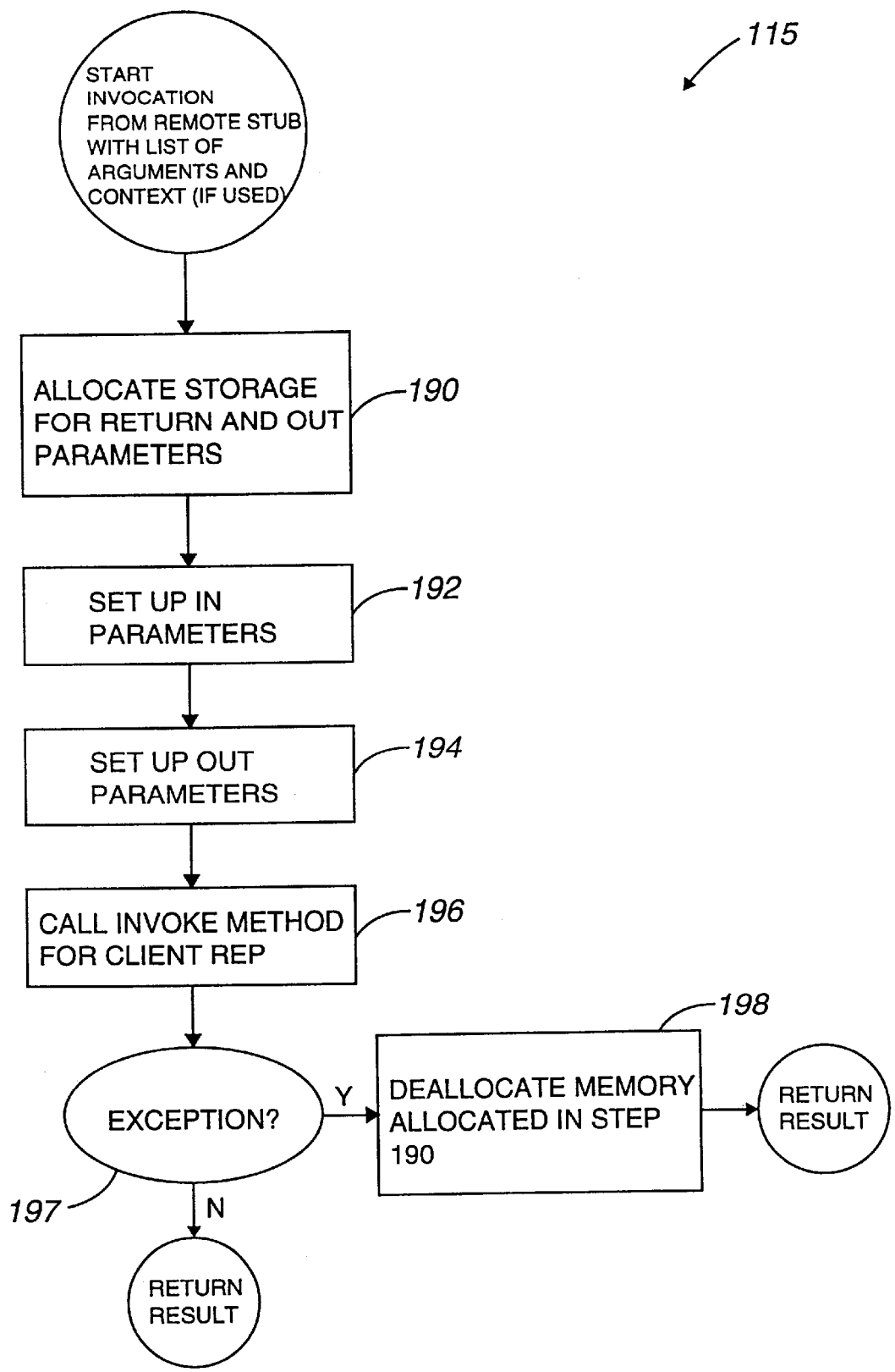
FIG. 9 is a process flow diagram which illustrates steps involved with executing a remote stub in accordance with one embodiment of the present invention.

Referring next to FIG. 9, a method of executing a remote stub will be described in accordance with one embodiment of the present invention. That is, with reference to FIG. 8, step 115, the step of executing a remote stub, will be described in detail. The start of invocation from a remote stub with a list of arguments and a context, if a context is used, begins at step 190 which is the allocation of storage, or memory, for some return and out parameters, or parameters with a return processing direction and parameters with an out processing direction. Herein, the terms "in parameter" and "out parameter" may be used interchangeably with the phrases "parameter with an in processing direction" and "parameter with an out processing direction", respectively. Similarly, the terms "return parameter" and "inout parameter" will also be used interchangeably with the phrases "parameter with a return processing direction" and "parameter with an inout processing direction", respectively. In storage allocation step 190, storage is not allocated for inout parameters, as storage is preallocated for parameters with an inout processing direction. From storage allocation step 190, process control proceeds to step 192 where in parameters are set up. Each time an invoke method is called, the in parameters associated with arguments used in the invocation from the remote stub must be set up. Setting up in parameters entails creating an array of pointers to storage locations which hold in parameters which are to be passed as IN_PARAMs to the invoke method of FIG. 7. From the step of setting up in parameters, process control proceeds to step 194 in which out parameters, as well as return parameters, are set up. That is, an array of pointers to storage locations that will receive out parameters which are to be passed as OUT_PARAMs to the invoke method of FIG. 7 are created.

From step 194, the step of setting up out parameters, process control moves to step 196 in which a call is made to the invoke method for the client representation. It should be appreciated that the "signature," or basic elements, or an invoke method were previously described with respect to FIG. 7. Each client representation has an associated invoke method. The steps involved with calling the invoke method for the client representation will be discussed below with reference to FIG. 10. In step 197, a determination is made regarding whether the call to the invoke method in step 196 has resulted in an exception. If it is determined that there has been an exception, process control proceeds to step 198 where the memory which was allocated for the storage of return and out parameters in step 190 is deallocated. Process control then returns the result of the call to the invoke method. If it is determined in step 197 that there has been no exception, process control simply returns the result of the call to the invoke method.

Figure 10:
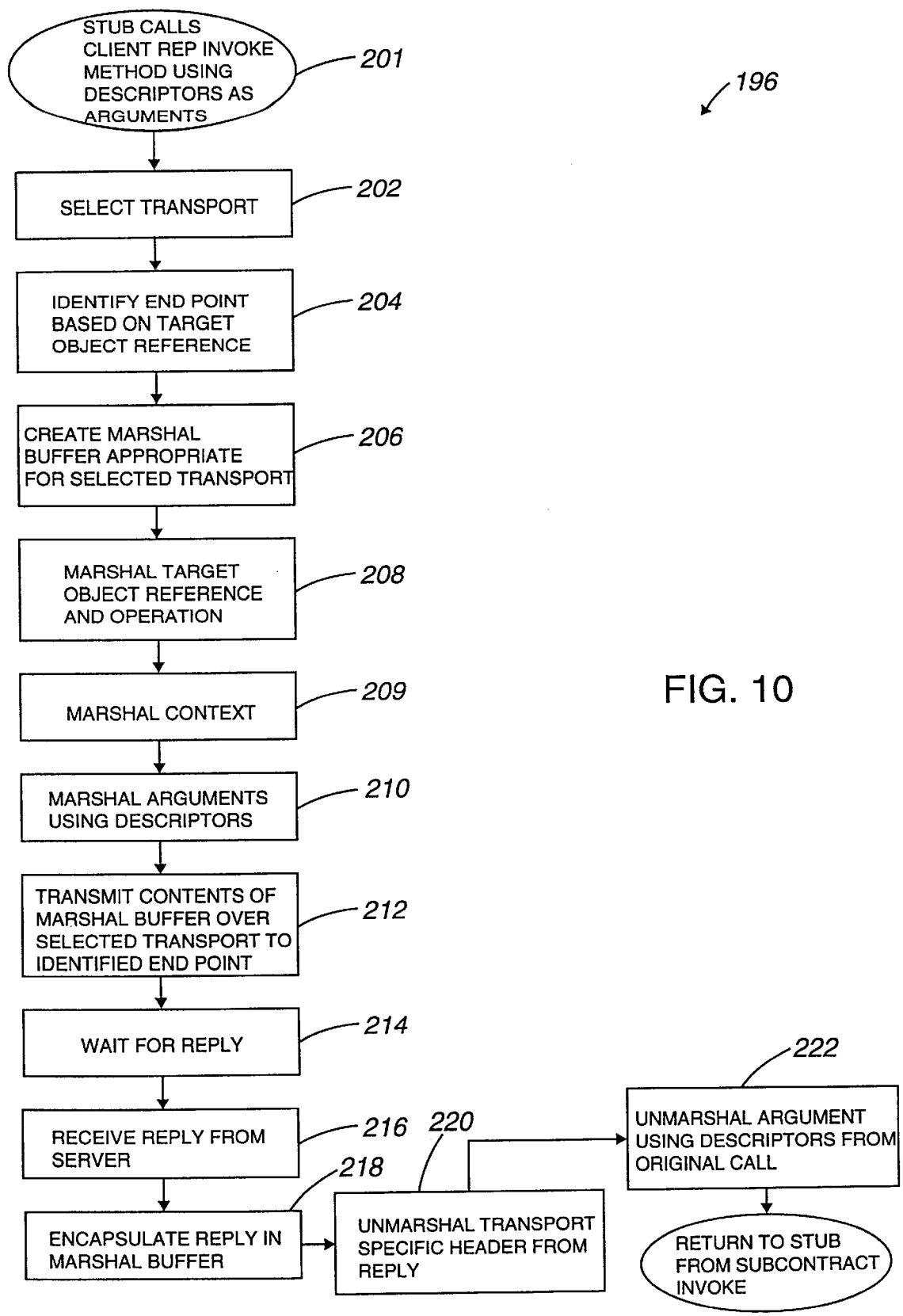
FIG. 10 is a process flow diagram which illustrates steps involved with a remote stub calling the invoke method of a client representation in accordance with one embodiment of the present invention.

Referring next to FIG. 10, the invoke method of a client representation will be described in accordance with one embodiment of the present invention. That is, with reference to FIG. 9, step 196, the step of calling an invoke method for the client representation, will be described in detail. The process begins at step 201 where the remote stub calls the invoke method of the client representation using descriptors, namely the method descriptor, the invocation descriptor, the parameter storage location descriptors, and the exception storage location descriptor, as arguments. In other words, the remote stub invokes an appropriate subcontract using descriptors as arguments. In step 202, a transport is selected. If a subcontract only supports one transport, that transport is selected. If the subcontract has multiple transports, metrics associated with the transports provide information which specifies the most appropriate transport to select. Once a transport has been selected, process control moves to a step 204 in which an end point is identified, based upon a target object reference. An end point is a "porthole", or connection, which is used to receive invocations and send messages. A CORBA object reference may contain a pointer to another object, and was previously described with respect to FIG. 2. The object key in the object reference, as was previously described with respect to FIG. 2, identifies the target object, or the object that is the target of a request. The identification of an end point may either occur in the transport layer of a client or in the subcontract layer of the client. After an end point is identified, process control proceeds to step 206 where a marshal buffer appropriate for the transport selected in step 202 is created. This occurs in the transport layer of the client side. A marshal buffer is essentially a network buffer which encapsulates information which is to be transported, and has the capability of encoding atomic data suitable for transport. A marshal buffer has an identifier or tag which specifies the encoding format of information which is to be marshaled or unmarshaled from the marshal buffer. A subcontract is able to identify the marshal buffer appropriate for the selected transport by virtue of the identifier.

After the marshal buffer appropriate for the selected transport is created, in step 208, the target object reference and the operation, or method description, are marshaled. Only the portions of the object reference which cannot be derived otherwise are marshaled in this step. In step 209, if a context is used, the context is marshaled. Only the information in the context which is of interest to the invoke method is picked out. From the step of marshaling the context, process control moves to step 210 where arguments are marshaled using descriptors. In the event that the object reference was passed as one of the arguments, it may be marshaled using information provided by the argument object reference. The process of marshaling arguments using descriptors will be described below with respect to FIG. 11. It should be appreciated that step 209, the step of marshaling the context, may either occur before step 210 (as shown), the step of marshaling arguments using descriptors, or after step 210. In some cases, when no context is used, step 209 may not occur at all, as there is clearly no need to marshal a context if a context is not used.

After the context, if used, and the arguments are marshaled, process control proceeds to step 212 where the contents of the marshal buffer are transmitted over the selected transport to the identified end point. For most selected transports, this step entails sending the contents in the marshal buffer over a wire. Transmission step 212 may be interpreted as the step of communicating from the client to the server. From transmission step 212, process control moves to step 214 where the client waits for a reply from the server. In a step 216, the client receives a reply from the server. After the client receives a reply from the server, process control proceeds to step 218 where the reply received from the server is encapsulated in a marshal buffer. If the reply is larger than the request, a new marshal buffer may be created in order to encapsulate the reply. However, if the reply is not larger than the request, the marshal buffer created in step 206 may be used to encapsulate the reply in step 218. It should be appreciated that the step of encapsulating the reply is done in the transport layer.

Once the reply is encapsulated in a marshal buffer, process control proceeds to step 220 where a transport specific header is unmarshaled from the reply which is encapsulated in the marshal buffer. A transport specific header contains information which pertains to the transport selected in step 202. Other headers include headers which identify arguments and headers which specify request identifiers. A pointer associated with the marshal buffer may be used to determine the beginning and the end of a header. This pointer moves from byte to byte in the marshal buffer. After the transport specific header is unmarshaled from the reply, process control proceeds to step 222 where arguments are unmarshaled using descriptors from the original call. Step 222 will be discussed below with respect to FIG. 12A. After the arguments are unmarshaled using descriptors, the process returns to the remote stub.

Figure 11:
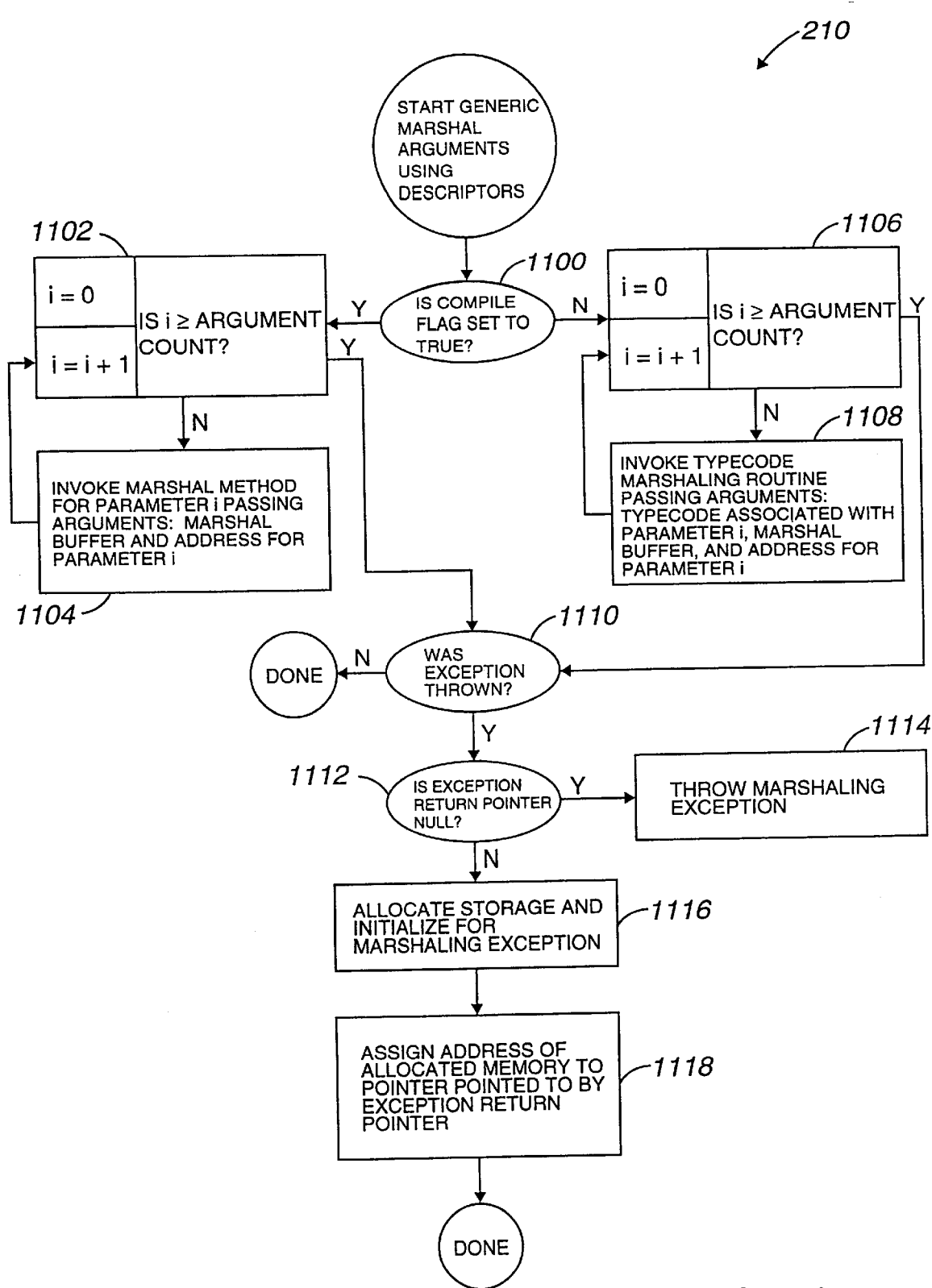
FIG. 11 is a process flow diagram which illustrates steps involved with marshaling arguments using descriptors in accordance with one embodiment of the present invention.

Referring next to FIG. 11, a method of marshaling arguments using descriptors, i.e. step 210 of FIG. 10, will be described in accordance with one embodiment of the present invention. Argument marshaling step 210 of FIG. 10 may be considered to be the process of generically marshaling arguments using descriptors, as this process is responsible for invoking the appropriate marshaling routine based upon whether the invocation path is static, i.e. compiled, or dynamic. Referring back to FIG. 11, the first step involved with generically marshaling arguments using descriptors is step 1100, in which it is determined whether the invocation path is static or dynamic. Specifically, in this embodiment, a determination is made in step 1100 regarding whether the compile flag of the invocation descriptor is set to true. If it is determined that the compile flag is set to true, the indication is that the invocation path is static, and process control proceeds to step 1102 where a counter i is initially set to zero, and where it is determined if the value of counter i is greater than or equal to the argument count. The argument count is passed as an argument. It is usually either IN_DESC_COUNT or OUT_DESC_COUNT, which were previously described with respect to the invocation descriptor of FIG. 4. The argument count represents the total number of parameters pointed to by the parameter descriptor passed in as an argument. For each parameter i, step 1104, where the marshal method appropriate for parameter i is invoked passing arguments which include an associated marshal buffer and the address for parameter i, provided by the parameter storage location descriptor, is repeated. The address for parameter i, is identified by the pointers to parameter address lists which are parts of the call to invoke a method, as described above with respect to FIG. 7. As there is one parameter address list for in parameters and one parameter address list for out parameters, the list passed to this method is dependent on whether "in" arguments are being marshaled on the client or "out" arguments are being marshaled on the server. Process control loops between step 1102, the step of determining whether all parameters have been processed, and step 1104, the step of invoking the marshal method appropriate for parameter i, until all parameters have been processed. Once all parameters have been processed, i.e. counter i equals the argument count, process control proceeds to step 1110 where it is determined whether an exception was thrown by any of the calls to invoke a marshal method.

If the determination is made in step 1100 that the compile flag is not set to true, the implication is that the invocation path is dynamic. After the determination that the invocation path is dynamic, process control proceeds to step 1106, where a counter i is initially set to zero, and in which it is determined if the value of counter i is greater than or equal to the argument count. The argument count represents the total number of parameters pointed to by the parameter descriptor passed in as an argument. The argument count is usually the IN_DESC_COUNT or the OUT_DESC_COUNT of an invocation descriptor. A step 1108, in which the typecode marshaling routine is invoked passing arguments including typecode associated with parameter i, the associated marshal buffer, and the address for parameter i, is repeated for each parameter i. In general, the typecode marshaling routine may be implemented by a typecode interpreter. Typecode may be found in both parameter descriptors and exception descriptors, whereas the address for parameter i is identified by the pointers to parameter address lists which are parts of the call to invoke a method, as described above with respect to FIG. 7. As there is one parameter address list for in parameters and one parameter address list for out parameters, the list passed to this method is dependent on whether "in" arguments are being marshaled on the client or "out" arguments are being marshaled on the server. Process control loops between step 1106, the step of determining whether all arguments have been processed, and step 1108, the step of invoking the typecode marshaling routine, until counter i exceeds the argument count, thereby indicating that all parameters have been processed. When it is determined that all parameters have been processed, process control proceeds to step 1110, in which it is determined whether an exception was thrown by any of the calls to invoke a marshal method.

If it is determined in step 1110, the step of determining whether an exception was thrown by any of the calls to invoke a marshal method, that no exceptions were thrown, the process of marshaling arguments using descriptors, i.e.

step 210 of FIG. 10, is completed. If it is determined that an exception was thrown, process control moves to step 1112 where a determination is made regarding whether the exception return pointer is null. That is, step 1112 is the determination of whether it is appropriate to throw a marshaling exception. If the exception return pointer, which was mentioned in a previous discussion of a call to an invoke method, is null, the indication is that a specific marshaling exception may be thrown to the caller. If this is the case, process control moves from step 1112, the step of determining whether the exception pointer is null, to step 1114 where a specific marshaling exception is thrown. If the exception return pointer is not null, process control proceeds to step 1116 where storage is allocated for a marshaling exception, and the exception is initialized. Then, in step 1118, the address of the storage, or memory, allocated in step 1116 is assigned to the pointer pointed to by the exception return pointer. After step 1118 is completed, the process of marshaling arguments using descriptors is completed.

It should be appreciated that a generic marshaling routine is shared by both the client side and the server side of a distributed object system. When called from the client side, IN_PARAM, IN_DESC, and IN_DESC_COUNT are passed as arguments. Similarly, when called from the server side, OUT_PARAM, OUT_DESC, and OUT_DESC_COUNT are passed as arguments. Further, it should be appreciated that many generic marshaling routines may exist. By way of example, a generic marshaling routine may exist to marshal arguments in a reverse order. However, the differences between compiled and typecode interpreted marshaling is only known within the generic marshaling routine.

Figure 12A:
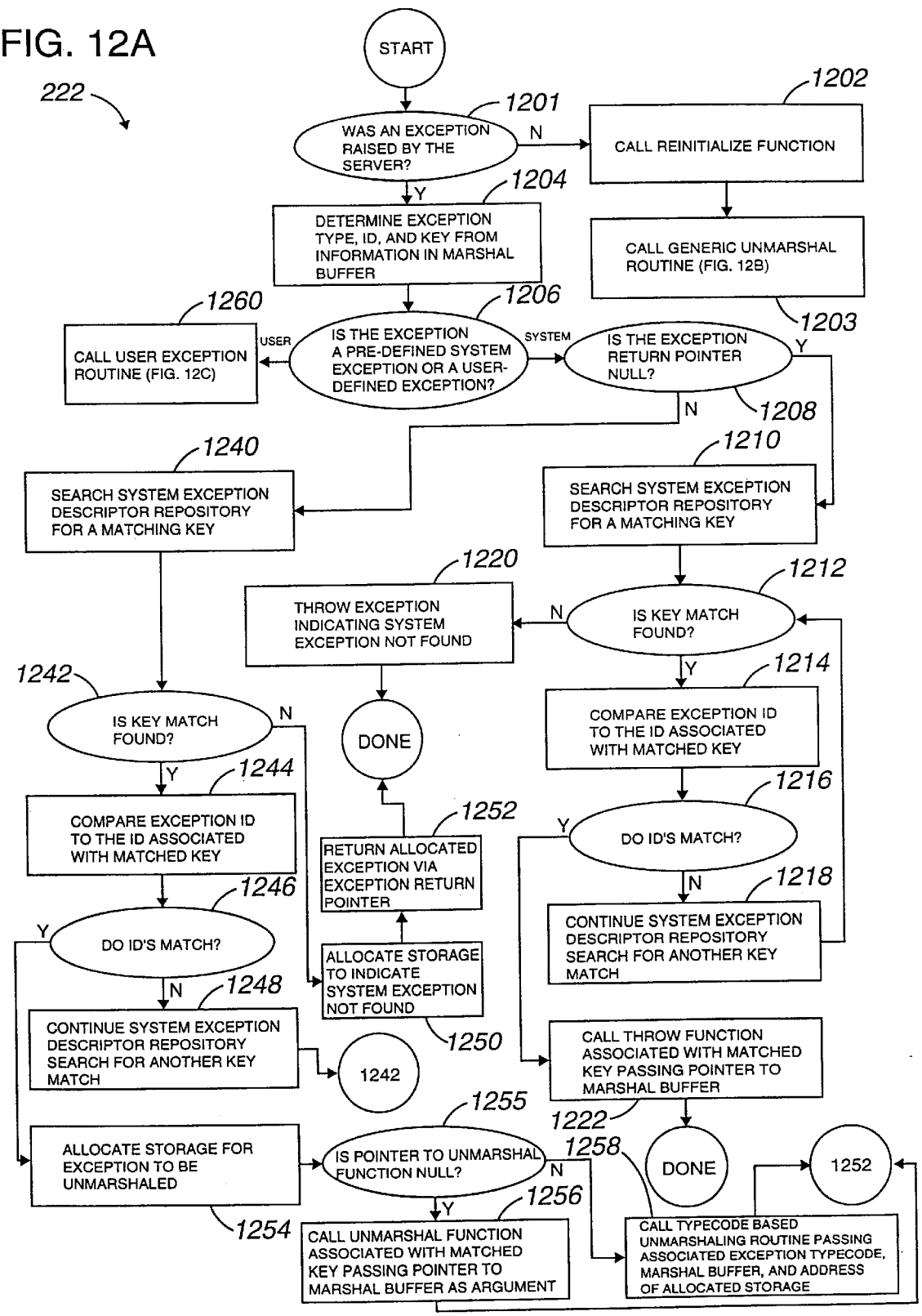
FIG. 12A is a process flow diagram which illustrates steps involved with unmarshaling arguments using descriptors in accordance with one embodiment of the present invention.

Referring next to FIG. 12A, a method of unmarshaling arguments using descriptors will be described in accordance with one embodiment of the present invention. That is, step 222 of FIG. 10 will be examined. The process of unmarshaling arguments using descriptors begins at step 1201 where it is determined whether an exception was raised by the server. If an exception was not raised by the server, process control proceeds to step 1202 where a reinitialize function is called to refresh previously used memory. After the reinitialize function is called, process control moves to step 1203 where a call is made to a generic unmarshal routine. It should be appreciated that the generic unmarshaling routine is used by both the client side and the server side of a distributed object system. The process of executing a generic unmarshal routine will be discussed below with reference to FIG. 12B.

If it is determined that an exception was raised by the server in step 1201, the exception type, identifier (ID), and key are determined from information in the marshal buffer in step 1204. The exception type, identifier, and key may be determined by any number of methods. By way of example, as will be appreciated by those skilled in the art, "peek" methods may be used on the marshal buffer. After the exception type, identifier, and key are determined, in step 1206, it is determined whether the exception raised by the server is a pre-defined system exception or a user-defined exception. If the exception is a user-defined exception, in a step 1260, a call is made to a user exception routine. The steps involved with the execution of a user-defined exception routine will be described below with respect to FIG. 12C.

In step 1206, if the exception is determined to be a pre-defined system exception, process control moves to step 1208 which is the determination of whether the exception return pointer is null. The determination of whether the exception return pointer is null may be considered to be a determination of whether it will eventually be necessary to allocate storage for an exception to be unmarshaled. If the exception return pointer is null, process control proceeds to step 1210 where a system exception descriptor repository, which may contain a listing of all system exceptions, is searched for a matching key. The system descriptor repository is a system-wide EXCEPTION_DESC, i.e. a list of pointers to exception descriptors that describe each system exception. After a search for a matching key, in step 1212, a determination is made regarding whether a key match was found for the key determined from information in the marshal buffer. If a key match was not found, an exception is thrown which indicates that a system exception was not found, and the process of unmarshaling arguments using descriptors is considered to be completed. If a key match was found for the key determined from information in the marshal buffer, the exception identifier (ID) is compared with the identifier (ID) associated with the matched key in step 1214. In other words, a comparison is made between the ID corresponding to the key found in the system exception descriptor repository and exception ID determined from information in the marshal buffer in step 1204.

After the exception ID is compared with the ID associated with the matched key, process control moves to step 1216 where it is determined whether the comparison of the exception ID with the ID associated with the matched key is favorable. That is, it is determined whether the exception ID and the ID associated with the matched key are consistent. If the exception ID and the ID associated with the matched key do indeed match, the throw function associated with the matched key is called with the pointer to the marshal buffer being passed in a step 1222. In a C++ embodiment, the throw function unmarshals the data associated with the exception and throws the exception. Throw functions were described above with reference to FIG. 6. Once the throw function associated with the matched key is called, the process of unmarshaling arguments using descriptors is completed. If it is determined in step 1216 that the exception ID and the ID associated with the matched key do not match, in step 1218, the system exception descriptor repository is searched for another key match. Process control then returns to step 1212 and the determination of whether a key match is found.

If the determination is made back in step 1208 that the exception return pointer is not null, in step 1240, a search for a matching key is made in the system exception descriptor repository. Then, in step 1242, a determination is made regarding whether a key match was found. If a key match was not found, in step 1250, storage is allocated to indicate that a system exception was not found. Hence, an allocated exception is created. The allocated exception is then returned via the exception return pointer in step 1252. That is, the address of memory allocated to the exception is returned, and the process of unmarshaling arguments using descriptors is completed.

If a key match was found in step 1242, process control moves to step 1244 in which the exception identifier (ID) is compared with the identifier (ID) associated with the matched key. From step 1244, process control moves to step 1246 where it is determined whether the comparison of the exception ID with the ID associated with the matched key results in a match. If the exception ID and the ID associated with the matched key do not match, the system exception descriptor repository is searched for another key match in step 1248. Once the system exception descriptor repository is searched for another key match, process control returns to step 1242 where it is determined if another key match has been found. If the exception ID and the ID associated with the matched key do indeed match, storage is allocated in step 1254 for the exception to be unmarshaled. Then, in step 1255, it is determined if the pointer to the unmarshal function associated with the found exception descriptor is null. If the pointer is null, the implication is that the unmarshaling function to be called is dynamic, or typecode based. The typecode based unmarshaling routine is called in step 1258, passing the associated exception typecode, the associated marshal buffer, and the address of the allocated storage. It should be appreciated that the associated exception typecode may be found from the exception descriptor repository. After the unmarshaling routine is called in step 1258, process control proceeds to step 1252, where the allocated exception is returned via the exception return pointer, and the process of unmarshaling arguments using descriptors is completed. If the pointer to the unmarshal function is not null, then the unmarshaling function to be called is static, or compiled. In step 1256, a call is made to the unmarshal function associated with the matched key, and the pointer to the associated marshal buffer is passed as an argument. After the call to the unmarshal function, process control proceeds to step 1252, in which an allocated exception is returned via the exception return pointer.

Figure 12B:
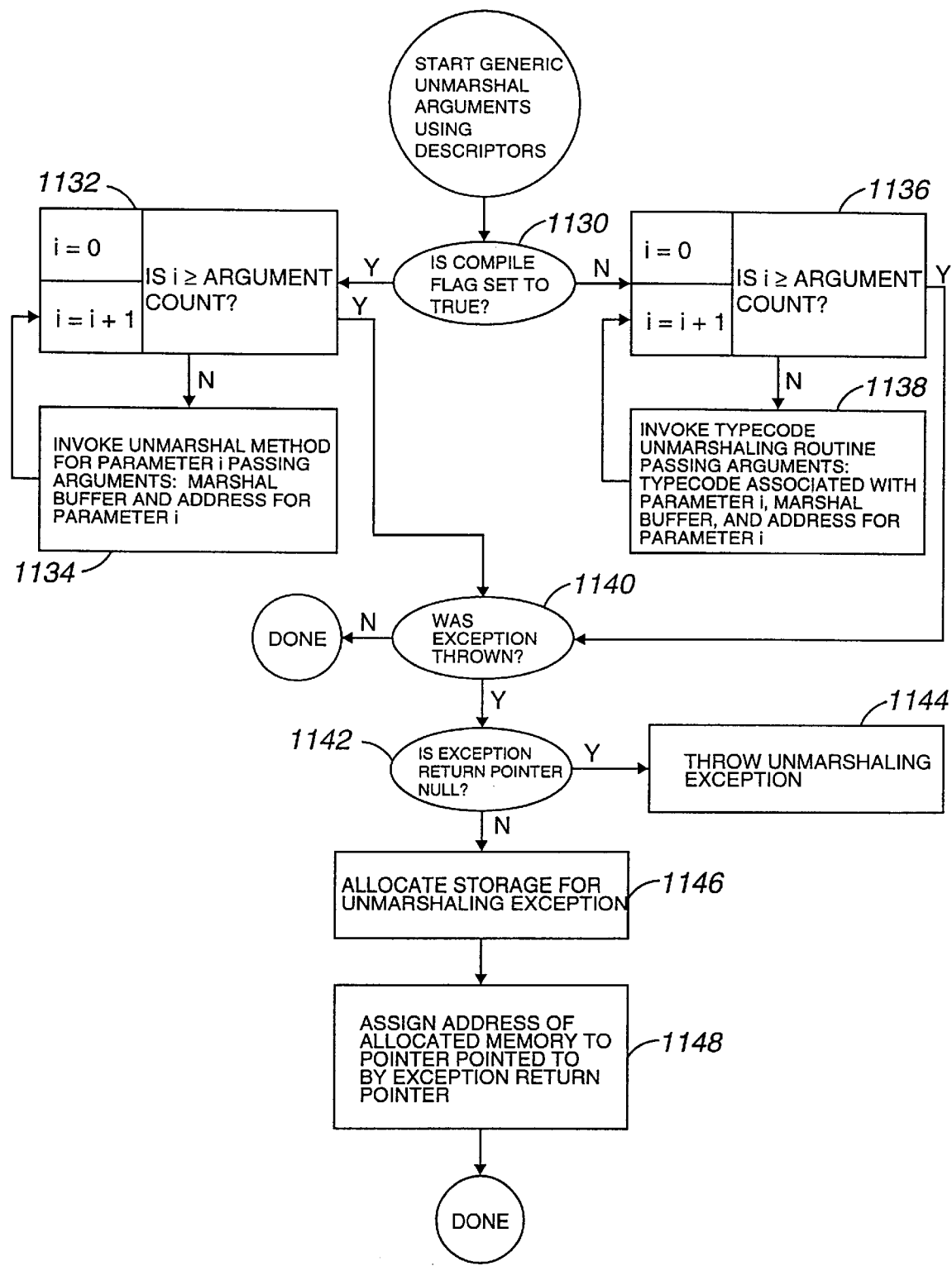
FIG. 12B is a process flow diagram which illustrates steps involved with generically unmarshaling arguments using descriptors in accordance with one embodiment of the present invention.

Referring next to FIG. 12B, a method of generically unmarshaling arguments using descriptors, i.e. step 1203 of FIG. 12A, will be described in accordance with one embodiment of the present invention. The method of generically unmarshaling arguments using descriptors also pertains to step 1510 of FIG. 15, which will be discussed below. The first step involved with generically unmarshaling arguments using descriptors is step 1130, where a determination is made regarding whether the compile flag of the invocation descriptor is set to true. If it is determined that the compile flag is set to true, the indication is that the invocation path is static, and process control proceeds to step 1132 where a counter i is initially set to zero, and where it is determined if the value of counter i is greater than or equal to the argument count. The argument count indicates the number of arguments or parameters to be unmarshaled. For each parameter i, step 1134, in which the unmarshal method, identified by the parameter descriptor which is passed in, appropriate for parameter i is invoked passing arguments which include an associated marshal buffer and the address for parameter i, is repeated. The address for parameter i is identified by the pointers to parameter address lists which are parts of the call to invoke a method, as described above with respect to FIG. 7. It should be appreciated that the terms "parameter storage location descriptor" and "parameter address list" may be used interchangeably. Process control loops between step 1132, the step of incrementing counter i and determining whether counter i is greater than or equal to the argument count, and step 1134, the step of invoking the unmarshal method for parameter i, until all parameters have been processed. Once all parameters have been processed, process control proceeds to step 1140 where it is determined whether an exception was thrown by any of the calls to invoke an unmarshal method.

If the determination is made in step 1130 that the compile flag is not set to true, the implication is that the invocation path is dynamic, that is, typecode interpreted. If the compile flag is not set to true, process control proceeds to step 1136, where a counter i is incremented and a determination is made regarding whether counter i is greater than or equal to the argument count. In other words, step 1136 increments a counter i and determines whether there are any parameters which remain to be processed. For each parameter i, step 1138, where the typecode unmarshaling routine is invoked passing arguments including typecode associated with parameter i, the associated marshal buffer, and the address for parameter i, is repeated until no parameters remain to be processed. Typecode may be found in both parameter descriptors and exception descriptors, whereas the address for parameter i, which is passed in, is identified as using pointers to parameter address lists as previously described. When it is determined that all parameters have been processed, process control proceeds to step 1140, where it is determined whether an exception was thrown.

In step 1140, it is determined whether an exception was thrown by any of the calls to invoke a unmarshal method. If no exceptions were thrown, the process of unmarshaling, arguments using descriptors is completed. If it is determined that an exception was thrown, process control moves to step 1142 where a determination is made regarding whether the exception return pointer is null. If the exception return pointer is null, the indication is that a specific unmarshaling exception may be thrown. If this is the case, a specific unmarshaling exception is thrown in step 1144. If it is determined that the exception return pointer is not null in step 1142, process control proceeds to step 1146 in which storage is allocated for an unmarshaling exception. Then, in step 1148, the address of the storage, or memory, allocated in step 1146 is assigned to the pointer pointed to by the exception return pointer. After step 1148, the process of unmarshaling arguments using descriptors is completed.

Figure 12C:
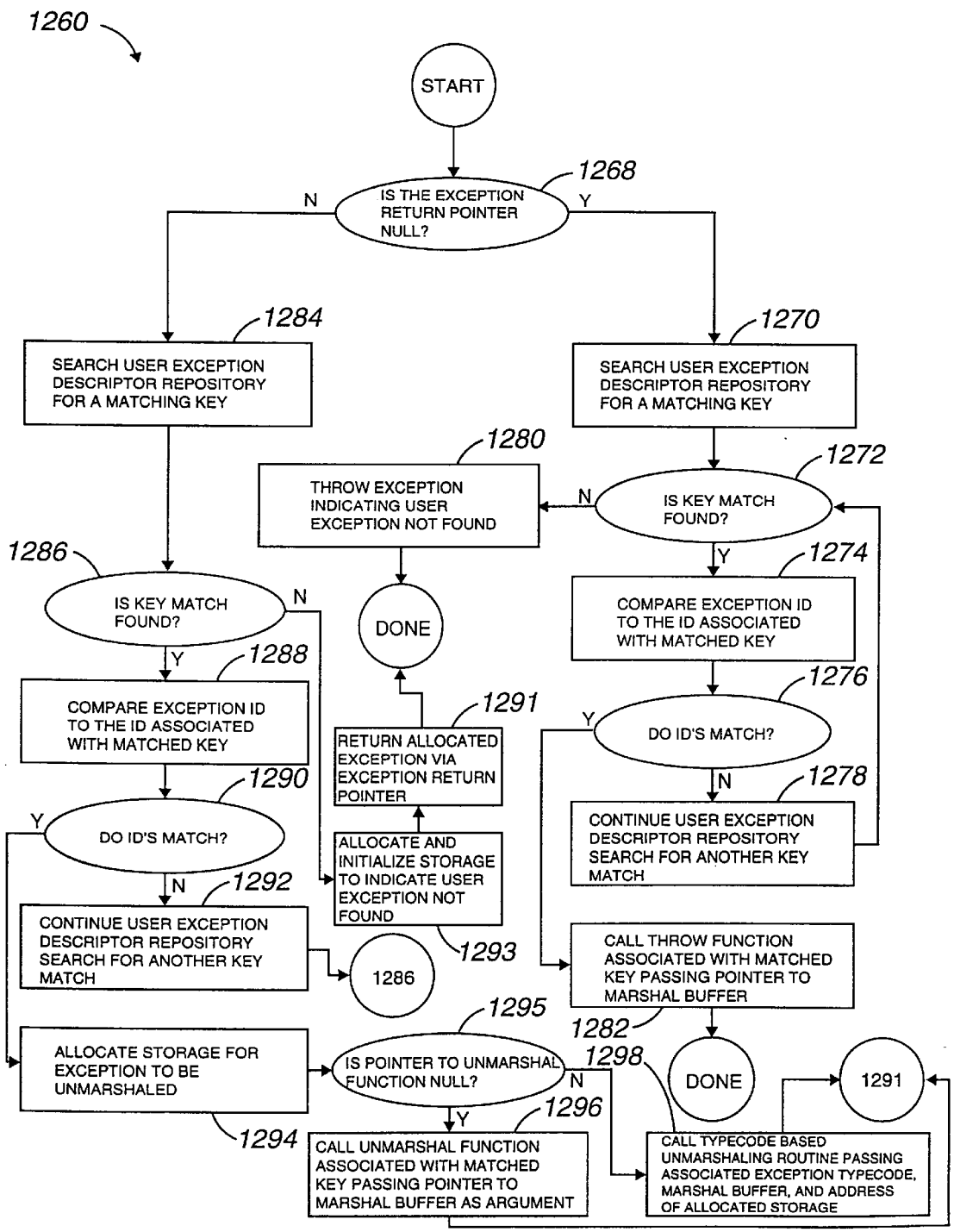
FIG. 12C is a process flow diagram which illustrates steps involved with calling a user exception routine in accordance with one embodiment of the present invention.

Referring next to FIG. 12C, the process of a user exception routine, i.e. step 1260 of FIG. 12A, will be described in accordance with one embodiment of the present invention. The process begins at step 1268 which is the determination of whether the exception return pointer is null. If the exception return pointer is null, process control proceeds to step 1270 in which the user exception descriptor repository is searched for a matching key. The user exception descriptor repository is a list of pointers to exception descriptors which describe user exceptions associated with a method, and is obtained form an associated invocation descriptor. In step 1272, a determination is made regarding whether a key match was found from the search of the user exception repository. If a key match was not found, an exception is thrown which indicates that a user exception was not found in the user exception repository, and the process of unmarshaling arguments using descriptors is completed. If a key match was found, in step 1274, the exception identifier (ID) is compared with the identifier (ID) associated with the matched key. After a comparison is made between the exception ID and the ID associated with the matched key, process control moves to step 1276 where it is determined whether the comparison of the exception ID with the ID associated with the matched key results in a match. If the exception ID and the ID associated with the matched key are a match, the throw function associated with the matched key is called with the pointer to the marshal buffer being passed in step 1282. Throw functions were described above with respect to FIG. 6. Once a throw function has been called, the process of unmarshaling arguments using descriptors is completed. If it is determined in step 1276 that the exception ID and the ID associated with the matched key do not match, in a step 1278, the user exception descriptor repository is searched for another key match. Process control then loops back to step 1272 where it is determined whether a key match is found.

Referring back to step 1268 where it is determined whether the exception return pointer is null, if the determination is made that the exception return pointer is not null, in step 1284, a search for a matching key is made in the user exception descriptor repository. Then, in step 1286, a determination is made regarding whether a key match was found. If a key match was not found, storage is allocated and initialized in step 1293 to indicate that a user exception was not found, and storage is allocated for a marshaling exception. In step 1291, the allocated exception is returned via the exception return pointer, and the process of unmarshaling arguments using descriptors is completed.

If a key match was found in step 1286, process control moves to step 1288 in which the exception ID is compared with the ID associated with the matched key. From comparison step 1288, process control moves to step 1290 where it is determined whether the comparison of the exception ID with the ID associated with the matched key results in a match. If the exception ID and the ID associated with the matched key do not match, in step 1292, the user exception descriptor repository is searched for another key match. After a search for another key match, process control returns to step 1286, where it is determined whether a key match was found. If it is determined in step 1290 that the exception ID and the ID associated with the matched key do indeed match, in step 1294, storage is allocated for the exception to be unmarshaled. Then, in step 1295, it is determined of the pointer to the unmarshal function associated with the found exception descriptor is null. If the pointer is null, the typecode based unmarshaling routine is called in step 1298, passing the associated exception typecode, the associated marshal buffer, and the address of the allocated storage. After the typecode based unmarshaling routine is called, process control proceeds to step 1291, where the allocated exception is returned via the exception return pointer, and the process of unmarshaling arguments using descriptors is completed. If the determination in step 1295 is that the pointer to the unmarshal function is not null, process control proceeds to step 1296, where a call is made to the unmarshal function associated with the matched key, and the pointer to the associated marshal buffer is passed as an argument. After the unmarshal function is called, process control returns an allocated exception via the exception return pointer in step 1291, and the process of unmarshaling descriptors is completed.

It should be appreciated that there are many variations of marshaling and unmarshaling routines. These variations depend upon the transport or protocol used. Usually, there are fewer marshaling and unmarshaling routines than there are transports. The generic marshaling and unmarshaling routines described above are suitable for most standard protocols in which arguments are marshaled from left to right and in a depth first order within each argument. Other generic routines may marshal or unmarshal arguments from right to left and in a breadth first order within each argument. Compiled marshaling and unmarshaling routines typically assume a depth-first order, whereas typecode interpreted marshaling and unmarshaling routines typically assume a breadth-first order. In most cases, the differences between compiled and typecode interpreted marshaling and unmarshaling routines are hidden in the generic routines, thereby enabling transport and subcontract code paths to remain the same irregardless of whether compiled or typecode interpreted marshaling or unmarshaling is used. As such, in most cases, invocation may be considered to be transport independent.

In some cases, transports may have protocols that require different marshaling and unmarshaling orders between arguments and within each data type. Hence, transports may utilize specific marshaling and. unmarshaling routines suitable for each protocol, as information about a particular method is available in the invocation descriptor, which was described above with respect to FIG. 4, that is associated with the method. By way of example, a right to left marshaling order may be accomplished by an index decrementing loop as opposed to an index incrementing loop which is used for a left to right marshaling order, as described with respect to FIGS. 11. If a standard, compiled depth-first argument marshaling and unmarshaling order is not suitable for a given transport or protocol, then other marshaling and unmarshaling orders, as for example a breadth-first order, may be accomplished using a typecode interpreter with typecode, since typecode contains the complete description, i.e. structure, of a data type. In other words, in this case, compiled marshaling and unmarshaling routines are not used as different typecode marshaling and marshaling interpreters are used. Therefore, if generic marshaling and unmarshaling routines are not appropriate for a given transport, enough information is available in the descriptors so that any marshaling or unmarshaling convention may be implemented, and the overall invocation process may be considered to be transport independent.

In the case of dynamic invocation, the same client representation invoke method is called as would be called in the case of static invocation, with the exception that the dynamic invocation system typically constructs the method descriptor, invocation descriptor, and other associated descriptors from information provided either by a user of an available interface repository. For dynamic invocation, only mandatory fields are provided in associated exception descriptors and parameter descriptors.

The server side of a distributed object-oriented system responds to requests which are received on receiving end points. The server side monitors receiving end points continually to determine when a request is received. Methods associated with the server invocation include a conventional constructor method and a conventional destructor method, which may be used to initialize and to destroy, a server invocation object. A server invocation object will be described below with reference to FIG. 14A. Other methods associated with the server side include an unmarshal method, a marshal method, and a marshal exception method. Each method has an associated invocation descriptor. The marshal method calls the generic marshal method as described above with respect to FIG. 11. Similarly, the unmarshal method calls the generic unmarshal method as described above with respect to FIG. 12. The marshal exception picks out arguments marshaled by the generic marshal.

Figure 13A:
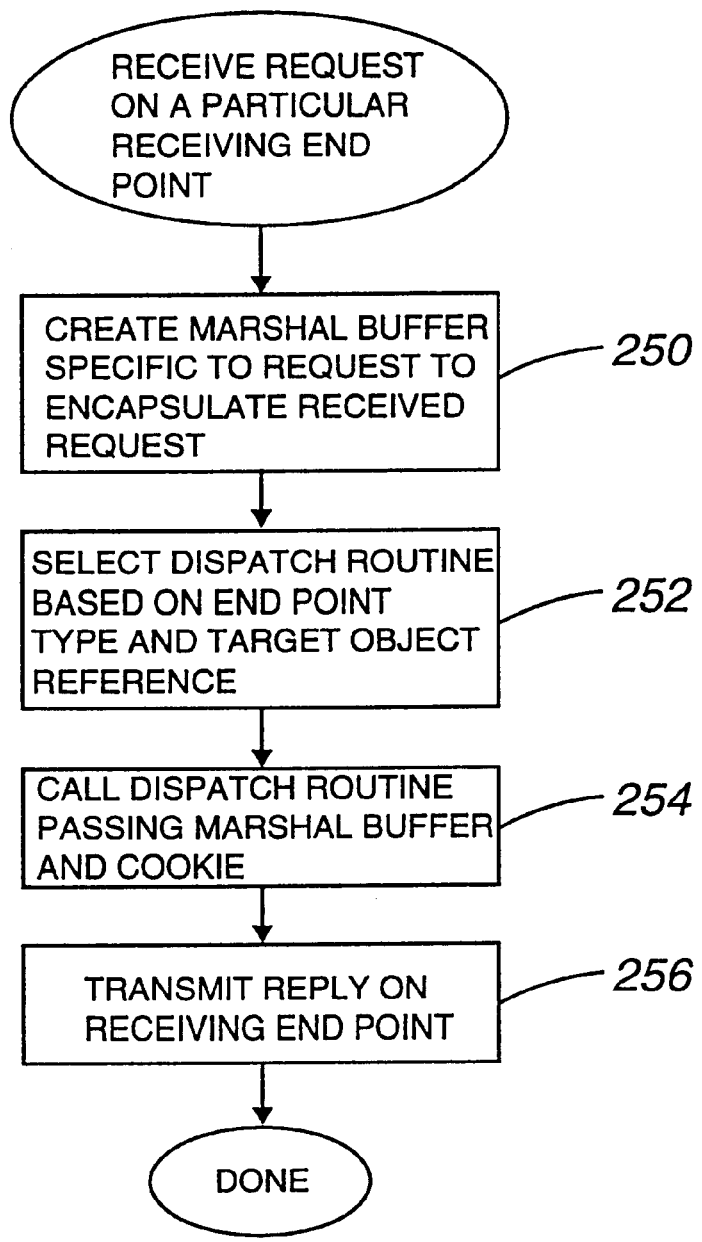
FIG. 13A is a process flow diagram which illustrates steps which occur on the server side of a distributed object-oriented system once a request is received on a particular receiving end point in accordance with one embodiment of the present invention.

Referring next to FIG. 13A, steps which occur on the server side of a distributed object-oriented system once a request is received on a particular receiving end point will be described in accordance with one embodiment of the present invention. The process begins at step 250, where a marshal buffer specific to the request is created in order to encapsulate the received request. The type of marshal buffer created is based upon the end point, which may be a dedicated end point or a cluster end point as described above with respect to FIG. 1b. In step 252, a dispatch routine is selected based upon the end point type and the target object reference. The associated subcontract and transport are usually factors in the choice of a dispatch routine. The selection of a dispatch routine is covered in patent application Ser. No. 08/670,700, now U.S. Pat. No. 6,189,041, filed concurrently herewith. After a dispatch routine is selected, process control moves to step 254 where the selected dispatch routine is called. The marshal buffer created in step 250 is passed, along with a "cookie", into the call to an appropriate dispatch routine. A cookie is a pointer to a data element. When a dispatch routine is called, there is typically a closure which is passed in as part of the call. A closure contains a pointer to a dispatch routine and a cookie. The process of calling, or executing, a typical dispatch routine is covered in detail below with reference to FIG. 13B. The call to a dispatch routine results in a reply being encapsulated in the marshal buffer. Finally, in step 256, the reply is transmitted on the receiving endpoint.

Figure 13B:
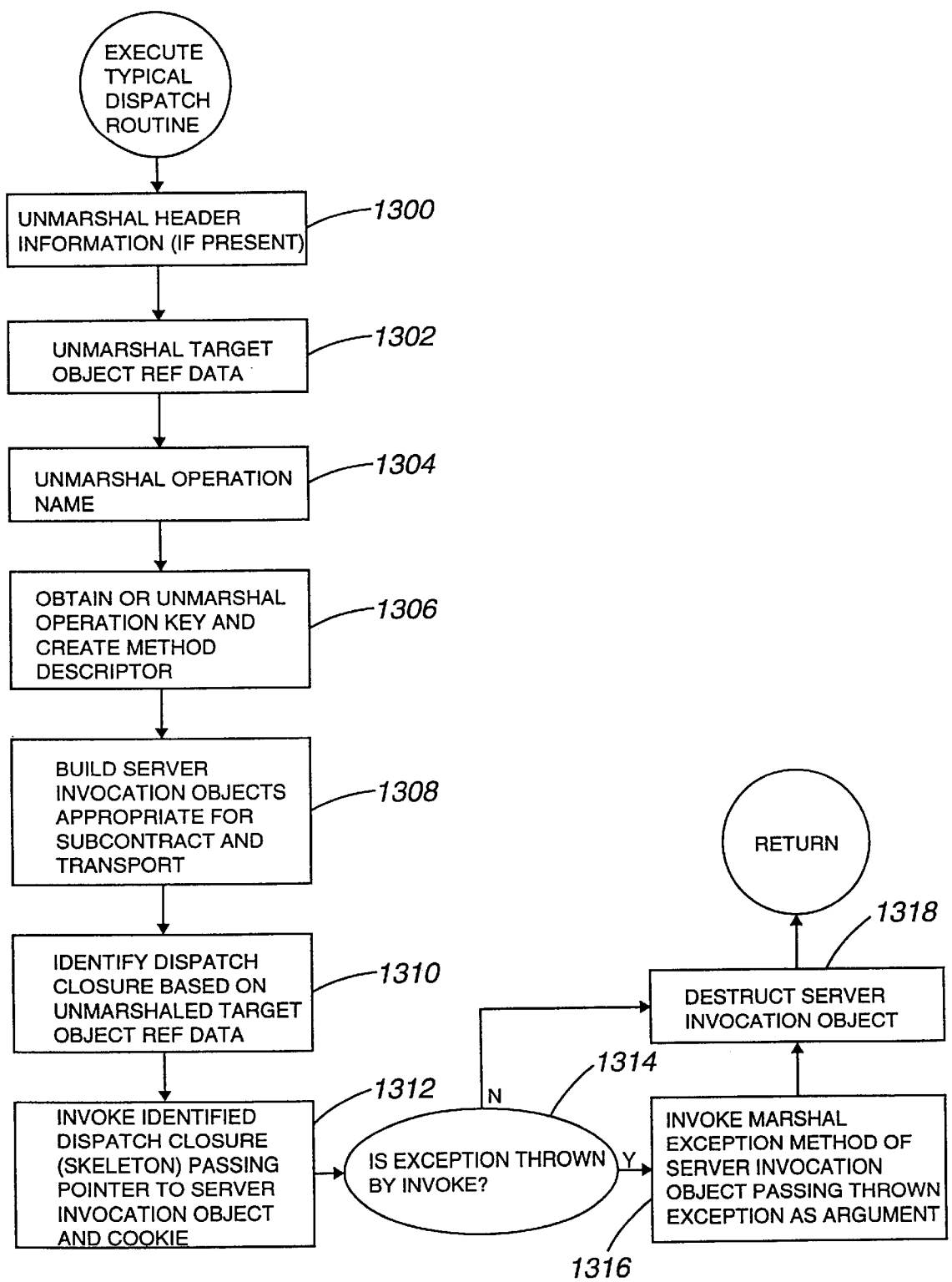
FIG. 13B is a process flow diagram which illustrates steps involved with executing a typical dispatch routine in accordance with one embodiment of the present invention.

Referring next to FIG. 13B, a method of executing a typical dispatch routine will be described in accordance with one embodiment of the present invention. In step 1300, header information is unmarshaled from the marshal buffer, if header information is present. The selected transport used to route a request from the client to the server may, at times, remove headers from the marshal buffer. In step 1302, target object reference data is unmarshaled. That is, any item which identifies the object to be invoked is accessed. Then, in step 1304, the name of the operation to be invoked or called is unmarshaled. From step 1304, process control proceeds to step 1306 where an operation key is obtained or unmarshaled from the marshal buffer, and an appropriate method descriptor is created. It should be appreciated that the order in which target object reference data, the operation name, and an operation key are unmarshaled is not crucial, as the order of the steps depends upon the particular protocol which is used.

In step 1308, a server invocation object, which is appropriate to the subcontract and transport associated with the dispatch routine, is built. The information needed to build a server invocation object is the information which is gathered in the steps of unmarshaling target object reference data, the operation name, and an operation key. The subcontract implicitly determines the appropriate kind of the server invocation object to be created. That is, a given subcontract will always be consistent in choosing the kind of server invocation object constructed for the same transport end point, or object. The structure of a server invocation object will be discussed below with reference to FIG. 14A., and the steps associated with building a server invocation object will be discussed below with reference to FIG. 14B.

After the server invocation object is created in step 1308, process control moves to step 1310 where a dispatch closure is identified based upon the unmarshaled target object reference data. There are many methods which may be used to identify a dispatch closure, including the use of a hash table or a call to user provided routines. The dispatch closure may be "looked up", i.e. identified, using the object key of the target object reference as a key. It should be appreciated that an associated subcontract and transport are usually factors in the choice of a dispatch routine. The identified dispatch closure, or dispatch routine, has a pointer to a skeleton dispatch function and a cookie, which is, in this case, a pointer to a servant.

In step 1312, the identified dispatch closure, and therefore, the identified skeleton, is invoked with a pointer to the server invocation object, which was built in step 1310, and a cookie. The identified skeleton may either be a static skeleton or a dynamic skeleton. A determination is made in step 1314 regarding whether an exception was thrown when the identified dispatch closure was invoked. If it is determined that an exception was thrown, process control proceeds to step 1316 where the marshal exception method of the server invocation object is invoked, with the thrown or returned exception passed in as an argument. Then, in step 1318, the server invocation object is destructed, and the process of executing a typical dispatch routine is completed. The step of destructing the server invocation object involves a call to a general purpose call-back closure. This closure allows dynamic skeletons to release allocated storage after marshaling. If it is determined in step 1314 that an exception was not thrown, process control proceeds directly to step 1318, in which the server invocation object is destructed. After the server invocation object is destructed, the process of executing a typical dispatch routine is completed. The steps involved with invoking a dispatch closure, i.e. invoking a skeleton, will be discussed below with reference to FIGS. 15 and 16.

Figure 14A:
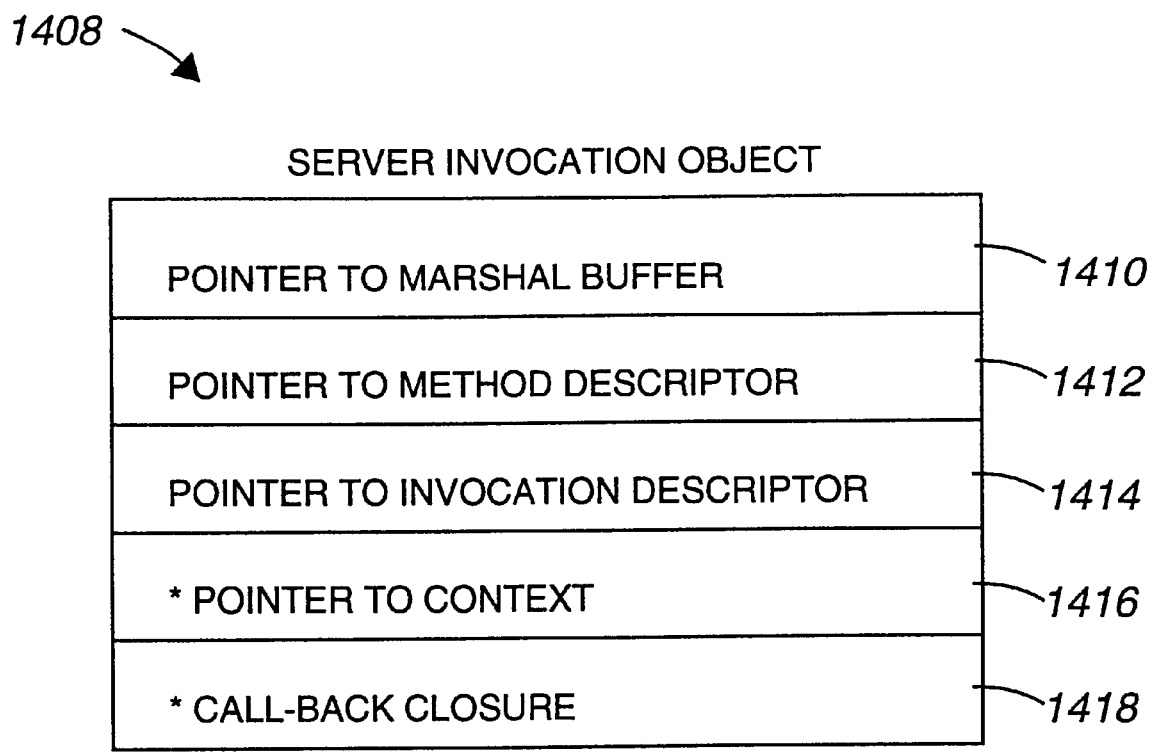
FIG. 14A is a diagrammatic representation of a server invocation object in accordance with one embodiment of the present invention.

Referring next to FIG. 14A, the structure of a typical server invocation object will be described in accordance with one embodiment of the present invention. A server invocation object 1408 is a data structure which may include a pointer to a marshal buffer 1410, a pointer to a method descriptor 1412, and a pointer to an invocation descriptor 1414. Server invocation object 1408 is used in the invocation of a method on the server side of a distributed object system. Specifically, server invocation object 1408 contains functionality used by the server to execute a method call. It should be appreciated that methods associated with server invocation object 1408 may be overwritten with other methods. In the described embodiment, server invocation object 1408 is a C++ object, or data structure, which has marshal, unmarshal, and marshal-exception methods.

Server invocation object 1408 may optionally include elements other than pointer to a marshal buffer 1410, pointer to a method descriptor 1412, and pointer to an invocation descriptor 1414. By way of example, server invocation object 1408 may also include a pointer to a context 1416, if a context is present, and a call-back closure 1418 which contains a pointer to a call-back function and a pointer to a data element, i.e. a cookie. Call-back closure 1418 may be used by the dynamic skeleton interface (DSI) to aid in the process of destructing and deallocating storage allocated during dynamic skeleton invocation which could not be destructed or returned because the allocated storage contains results or descriptors which must either be marshaled or are needed for marshaling results. It should be appreciated that server invocation object 1408 may include additional pointers and functions, depending upon the requirements of a system.

Figure 14B:
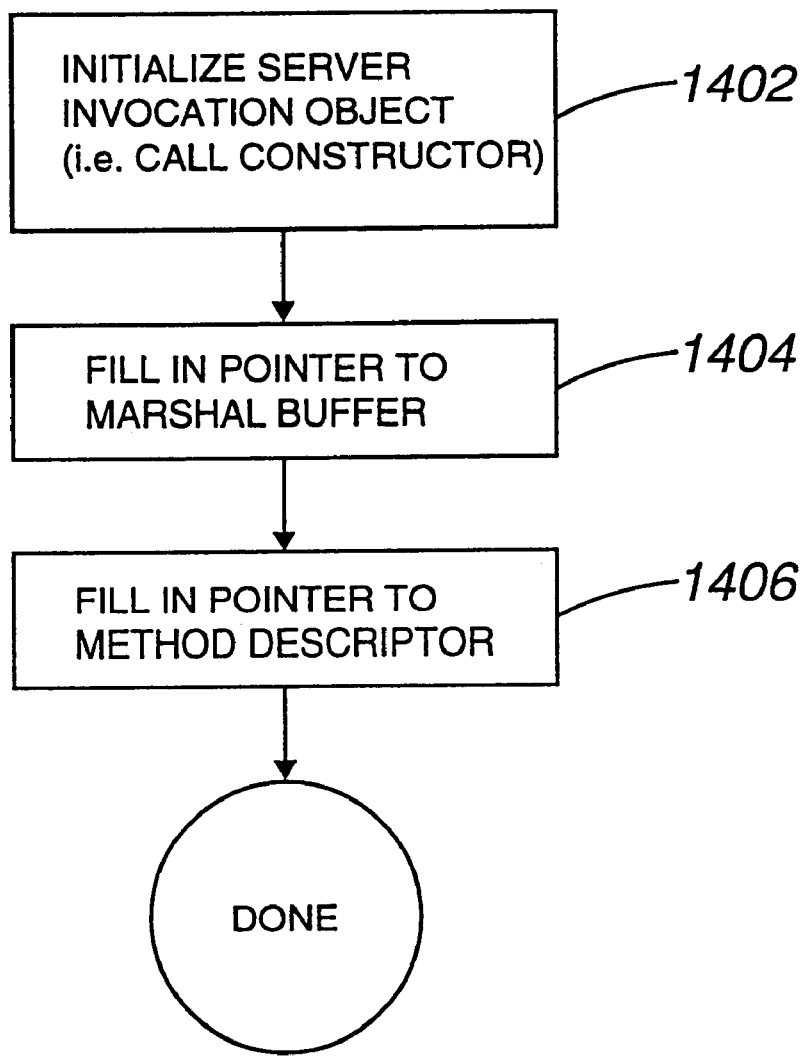
FIG. 14B is a process flow diagram which illustrates steps involved with building a server invocation object in accordance with one embodiment of the present invention.

Referring next to FIG. 14B, a method of building a server invocation object will be described in accordance with one embodiment of the present invention. In other words, FIG. 14B is an overview of step 1308 of FIG. 13B. In step 1402, the server invocation object is initialized by calling the constructor method of the server invocation object. Constructor methods are commonly used to initialize data structures, and are well known to those skilled in the art. A subcontract uses a constructor method to build a server invocation object. Subcontracts determine the type of server invocation object which is to be built. Specifically, subcontracts determine any optional elements, as for example an optional pointer to a context as described with respect to FIG. 14A, which may be included as a part of a server invocation object. The determination, however, is implicit within a subcontract. In other words, a given subcontract will always build the same kind of server invocation object for the same transport end point, or object.

After the server invocation object is initialized, in step 1404, the pointer to the appropriate marshal buffer, or the marshal buffer associated with the server invocation object, is filled in. Then, in step 1406, the pointer to a method descriptor associated with the server invocation object is filled in. It should be appreciated that in some embodiments, the pointer to the method descriptor may be filled in before the pointer to the marshal buffer is filled in. Although the server invocation object includes a pointer to an invocation descriptor, that pointer is filled in by the skeleton after the server invocation object is built. After the pointer to a method descriptor is filled in, the process of building a server invocation object is completed.

Figure 15:
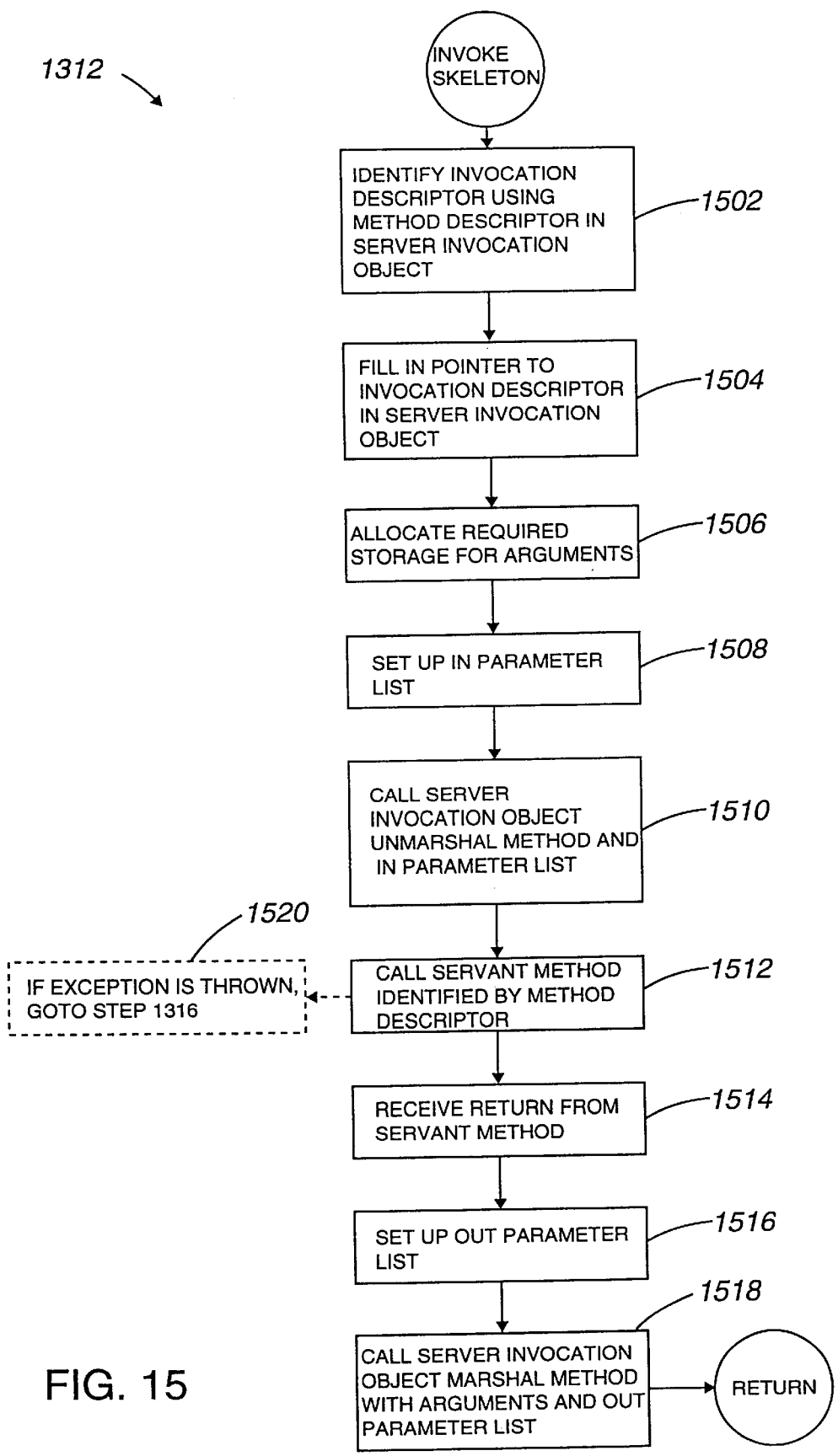
FIG. 15 is a process flow diagram which illustrates steps involved with invoking a skeleton which is static in accordance with one embodiment of the present invention.

Referring next to FIG. 15, the step of invoking a dispatch closure, or skeleton, i.e. step 1312 of FIG. 13B, which is a static skeleton will be described in accordance with one embodiment of the present invention. Once a pointer to the server invocation object and the pointer to the servant are passed into the call to invoke the skeleton, the proper invocation descriptor is identified in step 1502 using the method descriptor pointed to in the server invocation object. In step 1502, control switching, a standard operation in most programming languages, occurs. After an invocation descriptor is identified using the method descriptor associated with the server invocation object, process control proceeds to step 1504, where the pointer to an invocation descriptor is filled in. The pointer to an invocation descriptor is a part of the server invocation object, as described above. After the pointer to the invocation descriptor is filled in, storage is allocated for arguments in step 1506. The skeleton has the capacity to determine how much memory to allocate for storage. An in parameter address list or storage location list is then set up in step 1508. The in parameter list is comprised of a list of pointers to locations where in arguments are to be unmarshaled.

After the in parameter list is set up, process flow moves to step 1510 where the unmarshal method for the server invocation object is called with the in parameter list. The unmarshal method called is specific to the particular server invocation object, and eventually calls the generic unmarshaling routine described above with respect to FIG. 12B, or an equivalent routine, passing IN_DESC, IN_DESC_COUNT, and an in parameter list. In step 1512, the servant method identified by the method descriptor is called. If an exception is thrown by the call to the servant method, process flow proceeds to step 1520, which is step 1316 of FIG. 13B, the invocation of the marshal exception method of the server invocation object. If an exception is not thrown, after the call to the servant method, a return is received from the servant method in step 1514. The servant method is may also be known as the "called" method. In step 1516, an out parameter list is set up. The out parameter list is comprised of a list of pointers to locations holding out arguments. After the out parameter list is set up, a call is made in step 1518 to the marshal method of the server invocation object with the out parameter list. The marshal method eventually calls the generic marshal method described above with respect to FIG. 11, or an equivalent, passing OUT_DESC, OUT_DESC_COUNT, and an out parameter list. After the call is made to the marshal method, the process of invoking a skeleton is complete.

Figure 16:
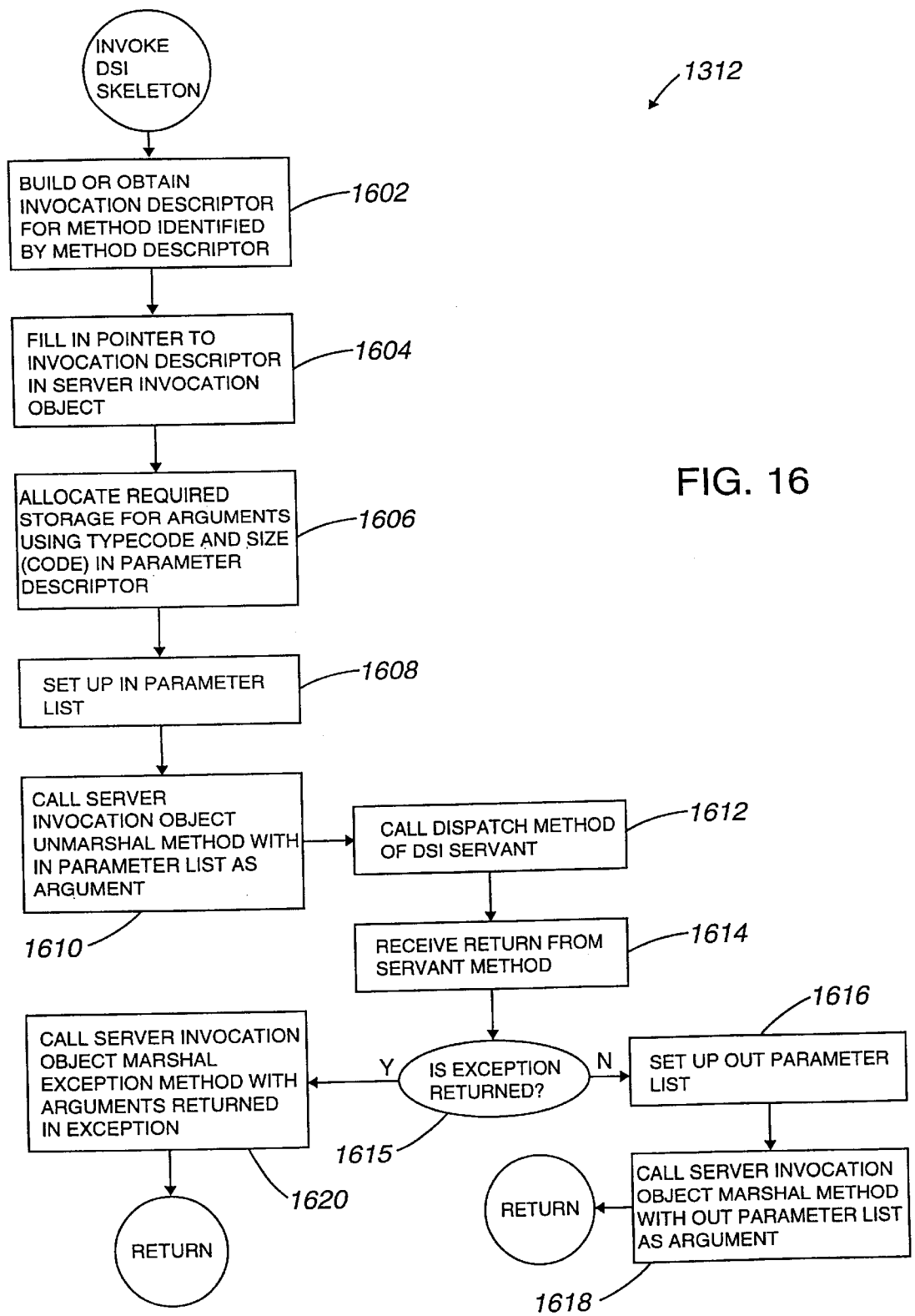
FIG. 16 is a process flow diagram which illustrates steps involved with invoking a skeleton in a dynamic skeleton interface in accordance with one embodiment of the present invention.

Referring next to FIG. 16, a method of invoking a dispatch closure, or skeleton, i.e. step 1312 of FIG. 13B, in a dynamic skeleton interface (DSI) will be described in accordance with one embodiment of the present invention. Initially, the pointer to the server invocation object and the pointer to the servant address are passed into the call to invoke the DSI skeleton. Then, in step 1602, an invocation descriptor for the method identified by the method descriptor pointed to by the server invocation object is built or obtained. The information necessary to build descriptors, also known as descriptor data structures, is contained in an interface repository. The interface repository, which stores interface-related information, is traversed to gather enough information to build all necessary descriptors, including the invocation descriptor. The information is then used by the DSI subsystem to create the descriptors. It should be appreciated that descriptors are created when needed, i.e. when a method is invoked via the DSI, using information in the interface repository. Dynamic, or typecode interpreted, marshaling and unmarshaling do not typically utilize pre-compiled method and invocation descriptors.

After an invocation descriptor is built or obtained, process flow moves to step 1604 where the pointer to the invocation descriptor, which is contained within the server invocation object, is filled in. Storage is then allocated in step 1606 for arguments using typecode provided by parameter descriptors pointed to by the invocation descriptor. It should be appreciated that it is not necessary to explicitly provide the size code in the parameter descriptor, as information regarding the amount of memory which must be allocated by a receiving process may be computed from the typecode.

After storage is allocated, an in parameter list is set up in step 1608. That is, a list of pointers which indicate where in arguments are to be unmarshaled is created. Then, a call is made in step 1610 to an unmarshal method associated with the server invocation object, with arguments and the in parameter list. Once the unmarshal method is called with the in parameter list, in step 1612, a call is made to the dispatch method of the DSI servant. Process control then proceeds to step 1614 where the return from the servant method is received. Upon receipt of the return from the servant method, in step 1615, it is determined if an exception was returned. If the determination is that an exception was returned, the marshal exception method of the server invocation object is called in step 1620 with the arguments which were returned in the exception. Once the call to the marshal exception method is made, the process of invoking a DSI skeleton is complete. If it is determined in step 1615 that an exception was not returned, process flow moves to step 1616 where an out parameter list, or a list of pointers to the locations in which out arguments are to be unmarshaled, is set up. After the out parameter list is set up, the marshal method of the server invocation object is called in step 1618, with the out parameter list as an argument. After the marshal method is called, the process of invoking a DSI skeleton is complete.

It should be appreciated that code relating to subcontracts and transports are not aware of differences between compiled and interpreted marshaling and unmarshaling. Further, dynamic and static skeletons utilize the same interface which is primarily defined by the server invocation object. The marshal method associated with the server invocation object eventually calls a generic marshal method or an equivalent method. Similarly, the unmarshal method associated with the server invocation object eventually calls a generic unmarshal method or an equivalent method. Details which relate to marshaling an unmarshaling arguments are embedded, i.e. hidden, in the generic marshal and unmarshal methods, or equivalent methods. However, the marshal and unmarshal method of a server invocation object, of which there may be many kinds, depends on the particular subcontract and transport used.

The present invention as described above employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, the present invention further relates to computer readable media that include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 17:
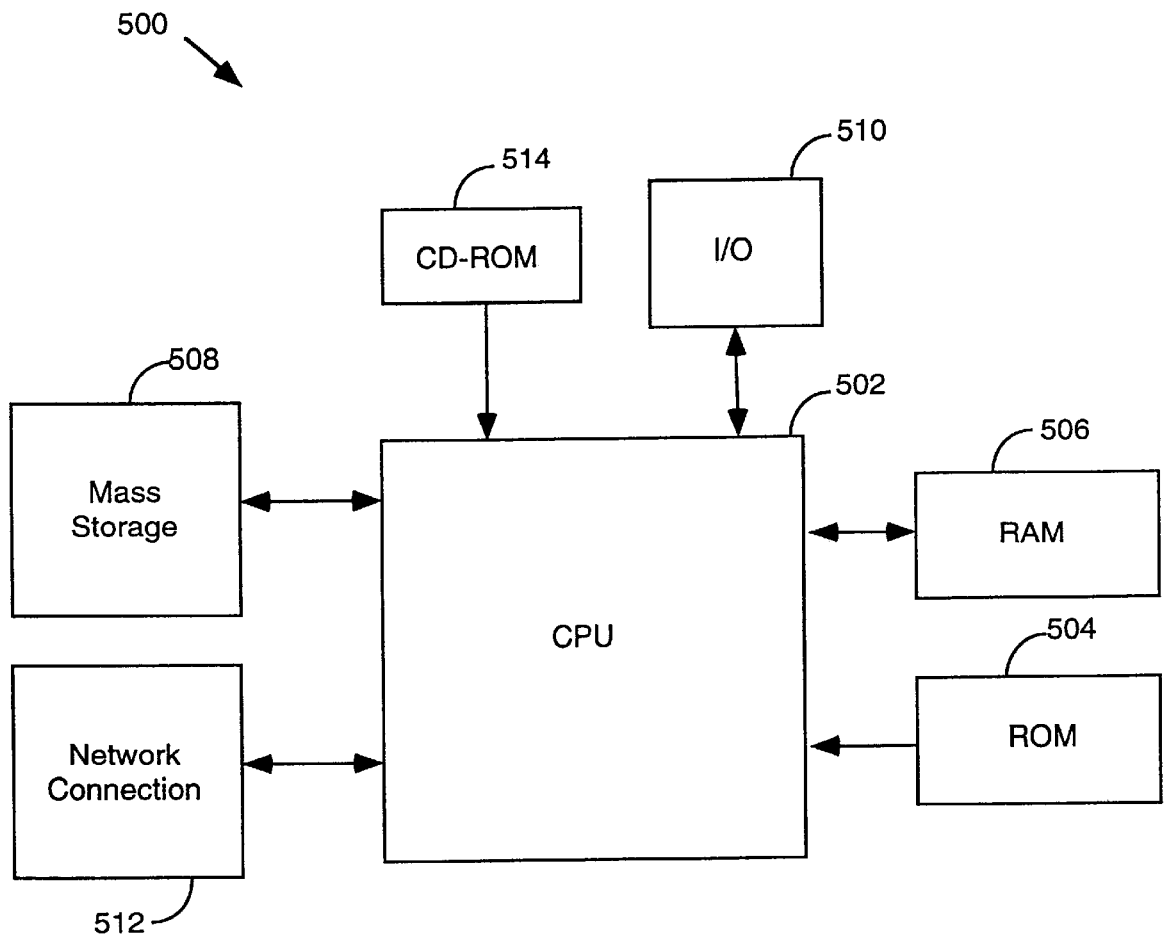
FIG. 17 illustrates a typical computer system in accordance with the present invention.

FIG. 17 illustrates a typical computer system in accordance with the present invention. The computer system 500 includes any number of processors 502 (also referred to as central processing units, or CPUs) that is coupled to memory devices including primary storage devices 504 (typically a read only memory, or ROM) and primary storage devices 506 (typically a random access memory, or RAM). As is well known in the art, ROM 504 acts to transfer data and instructions uni-directionally to the CPU and RAM 506 is used typically to transfer data and instructions in a bi-directional manner. Both primary storage devices 504, 506 may include any suitable computer-readable media as described above. A mass memory device 508 is also coupled bi-directionally to CPU 502 and provides additional data storage capacity. The mass memory device 508 may be used to store programs, data and the like and is typically a secondary storage medium such as a hard disk that is slower than primary storage devices 504, 506. Mass memory storage device 108 may take the form of a magnetic or paper tape reader or some other well-known device. It will be appreciated that the information retained within the mass memory device 508, may, in appropriate cases, be incorporated in standard fashion as part of RAM 506 as virtual memory. A specific mass storage device such as a CD-ROM 514 may also pass data uni-directionally to the CPU.

CPU 502 is also coupled to one or more input/output devices 510 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 502 optionally may be coupled to a computer or telecommunications network using a network connection as shown generally at 512. With such a network connection, it is contemplated that the CPU might receive information from the network, or might output information to the network in the course of performing the above-described method steps. The above-described devices and materials will be familiar to those of skill in the computer hardware and software arts.

Although only one preferred embodiment of the present invention has been described, it should be understood that the present invention may be embodied in many other specific forms without departing from the spirit or the scope of the present invention. In the described embodiments, specific data structures for the method descriptors, invocation descriptors, parameter descriptors and exception descriptors have been described. It will be apparent that these data structures can be widely varied within the scope of the present invention. Similarly, methods of marshaling and unmarshaling arguments may also be widely varied within the scope of the present invention. By way of example, steps involved with methods of marshaling and unmarshaling arguments may be reordered. Steps may also be removed or added without departing from the spirit or the scope of the present invention.

Additionally, in some situations, marshal and unmarshal methods associated with a common object, as for example a parameter, may be combined into a single method. For instances in which the marshal and unmarshal methods are identical, the addition of an argument in the function call could be used to specify whether marshaling or unmarshaling is desired. For instances in which the marshal and unmarshal methods are distinct, a new function could be created to perform both methods. This new function could include an argument to the function call which would specify whether the method desired was marshaling or unmarshaling. If a single function represents both marshaling and unmarshaling, in typecode and descriptor data structures with pointers to marshal and unmarshal methods, one pointer may be used to point to the single function. A boolean value or a flag may be implemented into the descriptor data structures which would indicate whether marshaling or unmarshaling is desired by the descriptor data structure. Therefore the described embodiments should be taken as illustrative and not restrictive, and the invention should be defined by the following claims and their full scope of equivalents.

In the claims:

1. A server invocation object for use in executing a method call in a distributed operating environment that utilizes an object request broker for facilitating communications between different objects, the server invocation object comprising:

a first identifier arranged to identify a marshal buffer associated with the server invocation object;

a second identifier arranged to identify a method descriptor associated with the server invocation object; and a third identifier pointer arranged to identify an invocation descriptor associated with the server invocation object, the invocation descriptor including arguments.

2. A server invocation object as described in claim 1 further comprising a fourth identifier arranged to identify a context associated with the server invocation object.

3. A server invocation object as described in claim 1 further comprising a call-back closure arranged to contain a fifth identifier arranged to identify a call-back function and additional identifiers arranged to identify data elements for the server invocation object.

4. A server invocation object as described in claim 1 wherein the associated invocation descriptor identifies at least one associated parameter descriptor.

5. A server invocation object as described in claim 4 wherein the associated parameter descriptor identifies marshal and unmarshal methods which are arranged to call generic marshal and unmarshal methods to marshal and unmarshal the arguments in the invocation descriptor.

6. A server invocation object for use in executing a method call in a distributed operating environment that utilizes an object request broker for facilitating communications between different objects, the server invocation object comprising:

a first identifier arranged to identify a marshal buffer associated with the server invocation object;

a second identifier arranged to identify a method descriptor associated with the server invocation object; and a third identifier pointer arranged to identify an invocation descriptor associated with the server invocation object, the invocation descriptor identifying at least one associated parameter descriptor, the at least one associated parameter descriptor being arranged to describe the characteristics associated with a parameter.

7. A server invocation object according to claim 6 wherein the at least one associated parameter descriptor identifies marshal and unmarshal methods which are arranged to call a generic marshal method to unmarshal arguments included in the invocation descriptor and to call a generic unmarshal method to unmarshal the arguments included in the invocation descriptor.

8. A server invocation object according to claim 7 wherein the generic marshal method is arranged to perform both typecode interpreted and compiled marshaling, and the generic unmarshal method is arranged to perform both typecode interpreted and compiled unmarshaling.

9. A server invocation object according to claim 7 further including a fourth identifier arranged to identify a context associated with the server invocation object.

10. A server invocation object according to claim 9 wherein the context includes a list of associations for a method associated with the method descriptor.

11. A server invocation object according to claim 7 further including a call-back closure arranged to contain a fifth identifier arranged to identify a call-back function.

12. A server invocation object for use in executing a method call in a distributed operating environment that utilizes an object request broker for facilitating communications between different objects, the server invocation object comprising:

a first identifier arranged to identify a marshal buffer associated with the server invocation object;

a second identifier arranged to identify a method descriptor associated with the server invocation object;

a third identifier pointer arranged to identify an invocation descriptor associated with the server invocation object, the invocation descriptor identifying marshal and unmarshal methods which are arranged to call a generic marshal method to unmarshal arguments included in the invocation descriptor and to call a generic unmarshal method to unmarshal the arguments included in the invocation descriptor; and a fourth identifier arranged to identify a context associated with the server invocation object, wherein the context includes a list of associations for a method associated with the method descriptor.

* * * * *